(12) United States Patent
Gibson et al.

(10) Patent No.: US 10,538,199 B2
(45) Date of Patent: Jan. 21, 2020

(54) SYSTEM AND METHOD FOR MONITORING AN AREA SURROUNDING A VEHICLE AND VEHICLE TRAILER

(71) Applicant: Nissan North America, Inc., Franklin, TN (US)

(72) Inventors: Andrew Gibson, Clarkston, MI (US); Roy Goudy, Farmington Hills, MI (US); Jeremy Chambers, Casco, MI (US); Neal Probert, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/719,227

(22) Filed: Sep. 28, 2017

(65) Prior Publication Data

US 2019/0092233 A1    Mar. 28, 2019

(51) Int. Cl.
*B60Q 9/00*    (2006.01)

(52) U.S. Cl.
CPC .................................. *B60Q 9/008* (2013.01)

(58) Field of Classification Search
CPC ........ G08G 1/162; G08G 1/0112; G08G 1/04; G08G 1/09626; G08G 1/166; G08G 1/16–1/168; B60W 50/00; G05D 1/0238; G05D 1/0253; B60R 11/04; B60R 2300/8093; B60R 2300/301; B60R 2300/406; G06K 9/00805; B62D 15/0265
See application file for complete search history.

(56) References Cited

U.S. PATENT DOCUMENTS

| | | | |
|---|---|---|---|
| 8,706,393 B2 | 4/2014 | Miller et al. | |
| 2005/0165546 A1* | 7/2005 | Aral | G01C 21/20 701/50 |
| 2015/0145713 A1 | 5/2015 | Maddox et al. | |
| 2016/0031482 A1* | 2/2016 | Lavoie | B62D 15/0285 701/41 |
| 2017/0217368 A1* | 8/2017 | Lewis | B60R 1/00 |
| 2018/0158337 A1* | 6/2018 | Koravadi | B60W 50/00 |

\* cited by examiner

*Primary Examiner* — Ryan W Sherwin
(74) *Attorney, Agent, or Firm* — Global IP Counselors, LLP

(57) ABSTRACT

A vehicle monitoring system includes an electronic controller and a wireless communicator. The electronic controller is configured to receive data representing points of interest on a vehicle and on a trailer towed by the vehicle, determine geometric relationships between the points of interest based on the data, and calculate an area surrounding the vehicle and the trailer based on the geometric relationships. The wireless communicator is operatively connected to the electronic controller and is configured to receive or transmit one of the data representing the points of interest, and the area based on the geometric relationships.

17 Claims, 24 Drawing Sheets

SYSTEM AND METHOD FOR MONITORING AN AREA SURROUNDING A VEHICLE AND VEHICLE TRAILER

BACKGROUND

Field of the Invention

The present invention generally relates to a vehicle monitoring system and method for calculating an area of interest surrounding a vehicle and a vehicle trailer being towed by the vehicle. More specifically, the present invention relates to a vehicle monitoring system and method for calculating the area of interest surrounding the vehicle and the towed vehicle trailer, and a location of a host vehicle with respect to the area of interest.

Background Information

Recently, vehicles are being equipped with a variety of informational systems such as navigation systems, satellite radio systems, two-way satellite services, built-in cell phones, DVD players and the like. Various informational vehicle-to-vehicle systems have been proposed that use wireless communications between vehicles, and further between vehicle and infrastructures such as roadside units. These wireless communications have a wide range of applications ranging from safety applications to entertainment applications. Also vehicles are sometimes equipped with various types of systems, such as global positioning systems (GPS), which are capable of determining the location of the vehicle and identifying the location of the vehicle on a map for reference by the driver. The type of wireless communications to be used depends on the particular application. Some examples of wireless technologies that are currently available include digital cellular systems, Bluetooth systems, wireless LAN systems and dedicated short range communications (DSRC) systems. In addition, vehicle-to-vehicle systems are known to detect a remote vehicle pulling a trailer, and warn a host vehicle about the remote vehicle length.

SUMMARY

As can be appreciated from the above, it is desirable to determine more details about the remote vehicle and the trailer being pulled by the remote vehicle.

In accordance with one aspect of the present invention, a vehicle monitoring system is provided and includes an electronic controller and a wireless communicator. The electronic controller is configured to receive data representing points of interest on a vehicle and on a trailer towed by the vehicle, determine geometric relationships between the points of interest based on the data, and calculate an area surrounding the vehicle and the trailer based on the geometric relationships. The wireless communicator is operatively connected to the electronic controller and is configured to receive or transmit one of the data representing the points of interest, and the area based on the geometric relationships.

In accordance with another aspect of the present invention, a vehicle monitoring method is provided and includes determining, by an electronic controller, geometric relationships between points of interest on a vehicle and on a trailer towed by the vehicle based on data representing the points of interest on the vehicle and on the trailer, calculating, by the controller, an area surrounding the vehicle and the trailer based on the geometric relationships, and monitoring, by the controller, a location of a host vehicle, different from the vehicle, in relation to the area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
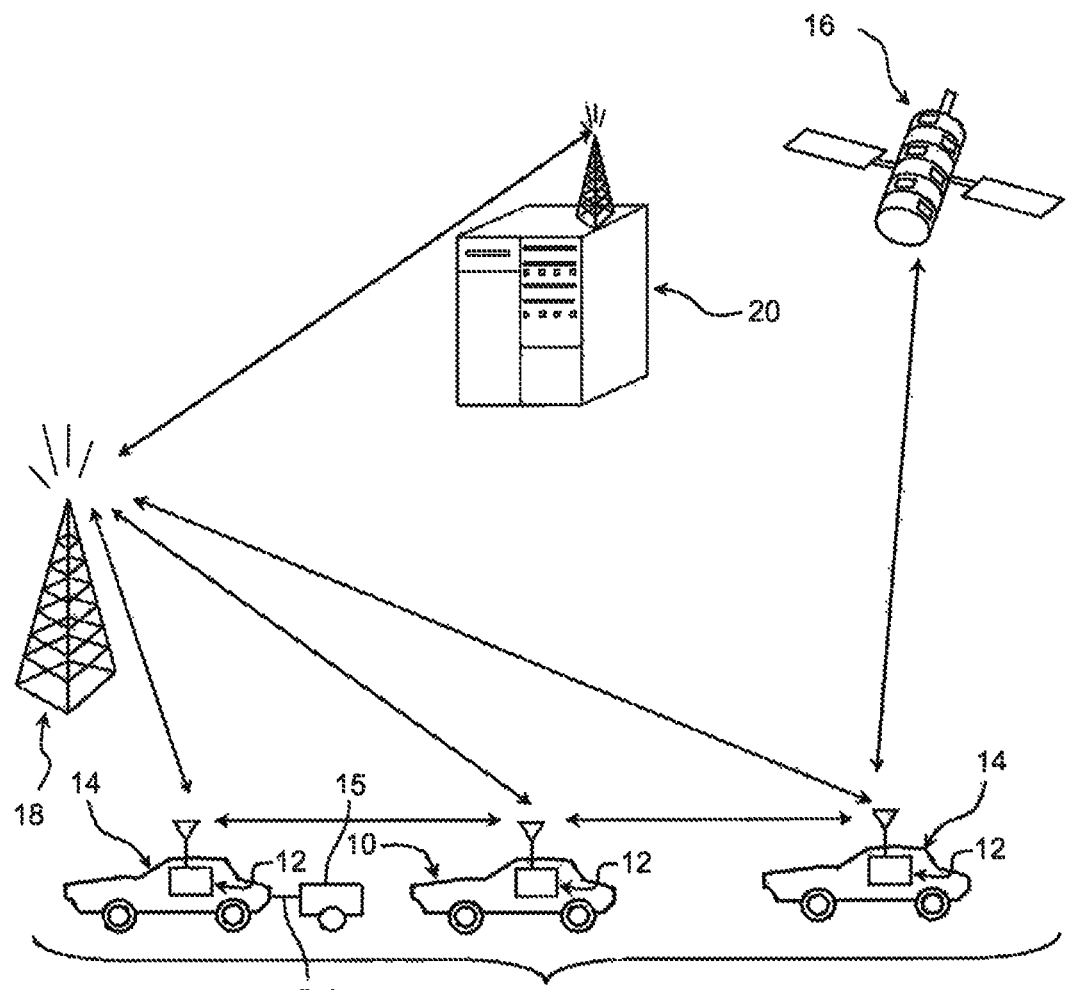
FIG. 1 is a schematic diagram illustrating an example of a host vehicle equipped with a vehicle monitoring system for monitoring an area surrounding a remote vehicle having a trailer being towed by the vehicle according to embodiments disclosed herein and components of a global positioning system (GPS)

Referring initially to FIG. 1, a two-way wireless communications network is illustrated that includes vehicle to vehicle communication and vehicle to base station communication. In FIG. 1, a host vehicle (HV) 10 is illustrated that is equipped with a vehicle monitoring system 12 according to a disclosed embodiment, and two remote vehicles (RV) 14 that also include the vehicle monitoring system 12. As discussed herein, the host vehicle 10 can also be referred to as a subject vehicle (SV). The remote vehicle 14 can also be referred to as a target or threat vehicle (TV). While the host vehicle 10 and the remote vehicles 14 are illustrated as having the same vehicle monitoring system 12, it will be apparent from this disclosure that each of the remote vehicles 14 can include another type of vehicle monitoring system that is capable of communicating information about at least the location and speed of the remote vehicle 14 to the host vehicle 10. Furthermore, as discussed herein, at least one of the remote vehicles 14 is towing a trailer 15, that is connected to the remote vehicle 14 by a trailer hitch 15-1. In the examples described herein, the trailer 15 is a single-axle trailer. However, as can be appreciated by one skilled in the art, the vehicle monitoring system 12 can be configured to monitor a remote vehicle 14 towing a trailer 15 having multiple axles.

The vehicle monitoring systems 12 of the host vehicle 10 and the remote vehicle 14 communicate with the two-way wireless communications network. As seen in FIG. 1, for example, the two-way wireless communications network can include one or more global positioning satellites 16 (only one shown), and one or more roadside (terrestrial) units 18 (only one shown), and a base station or external server 20. The global positioning satellites 16 and the roadside units 18 send and receive signals to and from the vehicle monitoring systems 12 of the host vehicle 10 and the remote vehicles 14. The base station 20 sends and receives signals to and from the vehicle monitoring systems 12 of the host vehicle 10 and the remote vehicles 14 via a network of the roadside units 18, or any other suitable two-way wireless communications network.

As shown in more detail in FIG. 2, each of the vehicle monitoring systems 12 includes an electronic controller 22 that will herein after be referred to simply as the controller 22. The controller 22 preferably includes a microcomputer having one or more processors with a vehicle monitoring control program that controls the components of the vehicle monitoring system 12 as discussed below. The controller 22 includes other conventional components such as an input interface circuit, an output interface circuit, and storage devices such as a ROM (Read Only Memory) device and a RAM (Random Access Memory) device. The microcomputer of the controller 22 is at least programmed to carry out vehicle monitoring in accordance with the flow chart of FIG. 3 as discussed below. It will be apparent to those skilled in the art from this disclosure that the precise structure and algorithms for the controller 22 can be any combination of hardware and software that will carry out the functions of the present invention. Furthermore, the controller 22 can communicate with the other components of the vehicle monitoring system 12 discussed herein via, for example, a controller area network (CAN) bus or in any other suitable manner as understood in the art.

Figure 2:
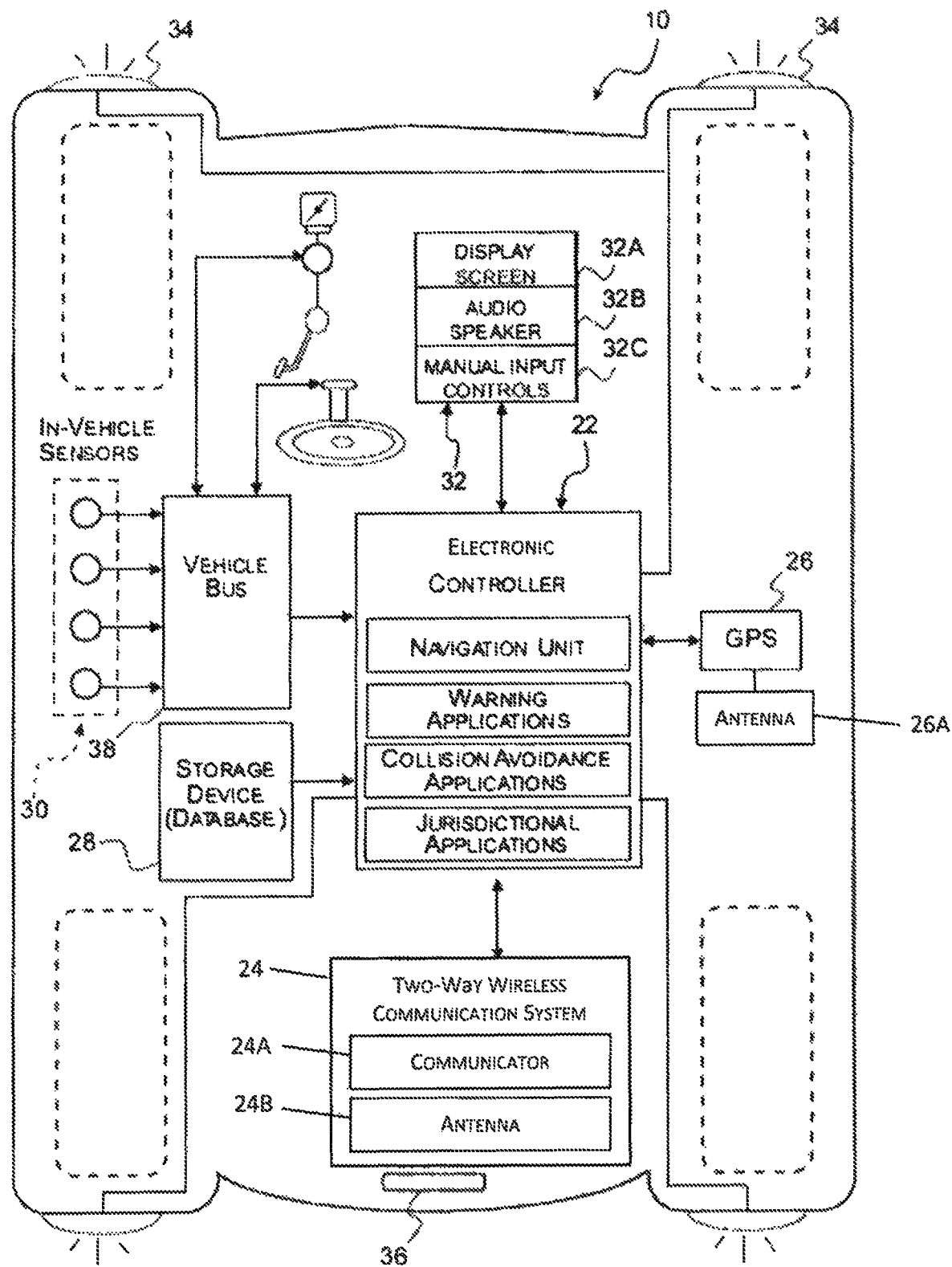
FIG. 2 is a block diagram of exemplary components of the host vehicle and the remote vehicles that are equipped with the vehicle monitoring system according to embodiments disclosed herein.

As shown in more detail in FIG. 2, the vehicle monitoring system 12 can further include a two-way wireless communication system 24, a global positioning system (GPS) 26, a data storage device 28, a plurality of in-vehicle sensors 30 and a human-machine interface unit 32. The human-machine interface unit 32 includes a screen display 32A, an audio speaker 32B and various manual input controls 32C that are operatively coupled to the controller 22. The screen display 32A and the audio speaker 32B are examples of interior warning devices that are used to alert a driver. Of course, it will be apparent to those skilled in the art from this disclosure that interior warning devices include anyone of or a combination of visual, audio and/or tactile warnings as understood in the art that can be perceived inside the host vehicle 10. The host vehicle 10 also includes a pair of front headlights 34 and rear brake lights 36, which constitutes examples of exterior warning devices of the vehicle monitoring system 12. These components can communicate with each other and, in particular, with the controller 22 in any suitable manner, such as wirelessly or via a vehicle bus 38.

The two-way wireless communications system 24 includes a wireless communicator 24A and an antenna 24B. The wireless communicator 24A is a two-way wireless communicator that is configured to transmit and receive wireless signals for caning out vehicle-to-vehicle (V2V) communications. The term "wireless communicator" as used herein includes a transceiver, a transmitter-receiver, and contemplates any device or devices, separate or combined, capable of transmitting and/or receiving wireless communication signals. The antenna 24B can be any suitable antenna capable of transmitting and/or receiving wireless communication signals between vehicles. In the illustrated embodiment, the wireless communications system 24 is configured and arranged to conduct direct two way communications between the host and remote vehicles 10 and 14 (vehicle-to-vehicle communications) and the roadside units 18 (roadside-to-vehicle communications). Moreover, in the illustrated embodiment, the wireless communications system 24 is configured to periodically broadcast a signal in the broadcast area. The wireless communication system 24 can be any suitable type of two-way communication device that is capable of communicating with the remote vehicles 14 and the two-way wireless communications network. In this example, the wireless communication system 24 can include or be coupled to a dedicated short range communications (DSRC) antenna to receive, for example, 5.9 GHz DSRC signals from the two-way wireless communications network. These DSRC signals can include basic safety messages (BSM) defined by current industry recognized standards that include information which, under certain circumstances, can be analyzed to warn drivers of a potential problem situation or threat in time for the driver of the host vehicle 10 to take appropriate action to avoid the situation. For instance, the DSRC signals can also include information pertaining to weather conditions, adverse driving conditions and so on. In the disclosed embodiments, a BSM includes information in accordance with SAE Standard J2735 as can be appreciated by one skilled in the art. Also, the wireless communication system 24 and the GPS 26 can be configured as a dual frequency DSRC and GPS devices as understood in the art.

The GPS 26 can be a conventional global positioning system that is configured and arranged to receive global positioning information of the host vehicle 10 in a conventional manner. Basically, the GPS 26 receives GPS signals via an antenna 26A from the global positioning satellite 16 at regular intervals (e.g. one second) to detect the present position of the host vehicle 10 or the remote vehicle 14 that the GPS 26 is provided on. The GPS 26 has an accuracy in accordance with industry standards, and thus, can indicate the actual vehicle position of the host vehicle 10 within a few meters or less (e.g., 10 meters less). The data representing the present position of the host vehicle 10 is provided to the controller 22 for processing as discussed herein. For example, the controller 22 can include or be coupled to navigation system components that are configured and arranged to process the GPS information in a conventional manner as understood in the art.

The data storage device 28 is a computer memory device (i.e., a nonvolatile memory device) can store road map data as well as other data that can be associated with the road map data such as various landmark data, fueling station locations, restaurants, weather data, traffic information and so on. Furthermore, the data storage device 28 can store other types of data, such as data pertaining to vehicle-related parameters and vehicle conditions. For example, the vehicle-related parameters can include predetermined data indicating relationships between vehicle speed, vehicle acceleration, yaw, steering angle, etc. when a vehicle is preparing to make a turn. In this event, the data storage device 28 can further store data pertaining to vehicle conditions, which can represent a determined vehicle condition of a vehicle of interest, such as the host vehicle 10, the remote vehicle 14, or both. This determined vehicle condition can represent, for example, a vehicle speed and acceleration that is determined for the vehicle of interest at a moment in time. Accordingly, the embodiments disclosed herein can evaluate whether the vehicle condition lies within the area of interest, as represented by the vehicle-related parameters, to determine, for example, whether the vehicle of interest is preparing to make a turn. The data storage device 28 can include, for example, a large-capacity storage medium such as a CD-ROM (Compact Disk-Read Only Memory) or IC (Integrated Circuit) card. The data storage device 28 permits a read-out operation of reading out data held in the large-capacity storage medium in response to an instruction from the controller 22 to, for example, acquire the map information and/or the vehicle condition information as needed or desired for use in representing the location of the host vehicle 10, the remote vehicle 14 and other location information and/or vehicle condition information as discussed herein for route guiding, map display, turning indication, and so on as understood in the art. For instance, the map information can include at least road links indicating connecting states of nodes, locations of branch points (road nodes), names of roads branching from the branch points, place names of the branch destinations, and so on. The information in the data storage device 28 can also be updated by the controller 22 or in any suitable manner as discussed herein and as understood in the art.

The in-vehicle sensors 30 are configured to monitor various devices, mechanisms and systems within the host vehicle 10 and provide information relating to the status of those devices, mechanisms and systems to the controller 22. For example, the in-vehicle sensors 30 can be connected to a traction control system, a windshield wiper motor or wiper motor controller, a headlight controller, a steering system, a speedometer, a braking system and so on as understood in the art.

As will now be discussed, the vehicle monitoring system 12 on-board the host vehicle 10 is configured to use vehicle-to-vehicle messaging to calculate the footprint of the remote vehicle 14, the trailer 15 and a potential contact zone surrounding the remote vehicle 14 and the trailer 15. Once the potential contact zone is known, the vehicle monitoring system 12 on-board the host vehicle 10 calculates the nearest distance to the potential contact zone, calculates if the host vehicle 10 is in the potential contact zone and warns the driver of the host vehicle 10 if the host vehicle 10 is in the potential contact zone. Although in this example, the operations discussed below are performed by the vehicle monitoring system on-board the host vehicle 10, such operations could be performed by the vehicle monitoring system 12 on-board the remote vehicle 14 and then the results can be provided to the host vehicle 10 via, for example, vehicle-to-vehicle communication as discussed herein, and to any other entity via wireless communication as understood in the art. Also, the operations discussed below can be performed by the vehicle monitoring system 12 which can be at a location remote from the host vehicle 10 and the remote vehicle 14, and the results can be provided to the host vehicle 10, the remote vehicle 14 and to any other entity via wireless communication as discussed herein.

For purposes of this example, it is assumed that two vehicles, namely, the host vehicle 10 and the remote vehicle 14, are travelling in the same direction as shown in FIG. 1. The preceding vehicle, which in this example is the remote vehicle 14 (also referred to as RV), is pulling the trailer 15 and the host vehicle 10 (also referred to as HV) is receiving information from the remote vehicle 14 via vehicle-to-vehicle communication as discussed herein.

Figure 3:
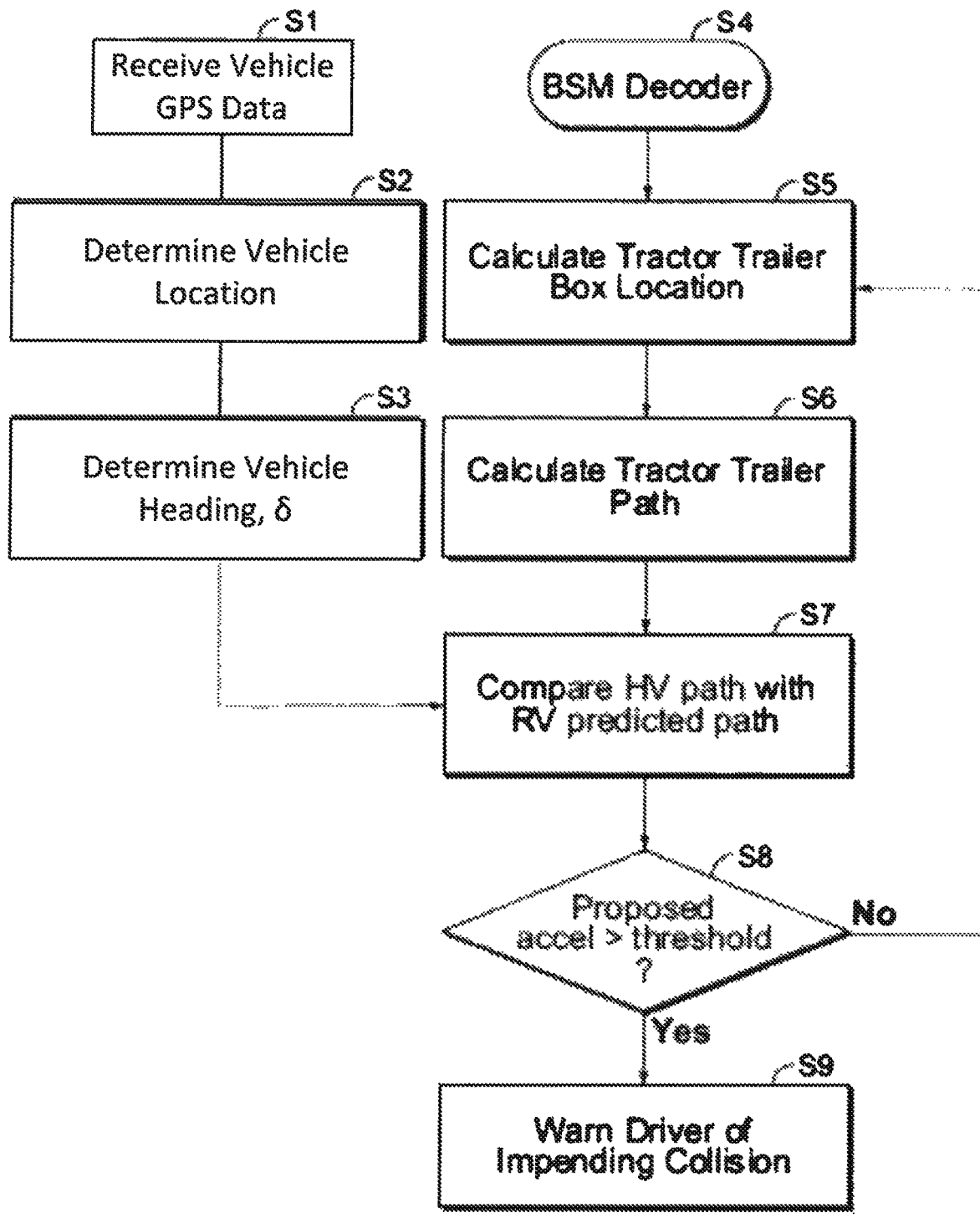
FIG. 3 is a flowchart showing examples of operations performed by the controller of the vehicle monitoring system and associated components as described herein.
Figure 4:
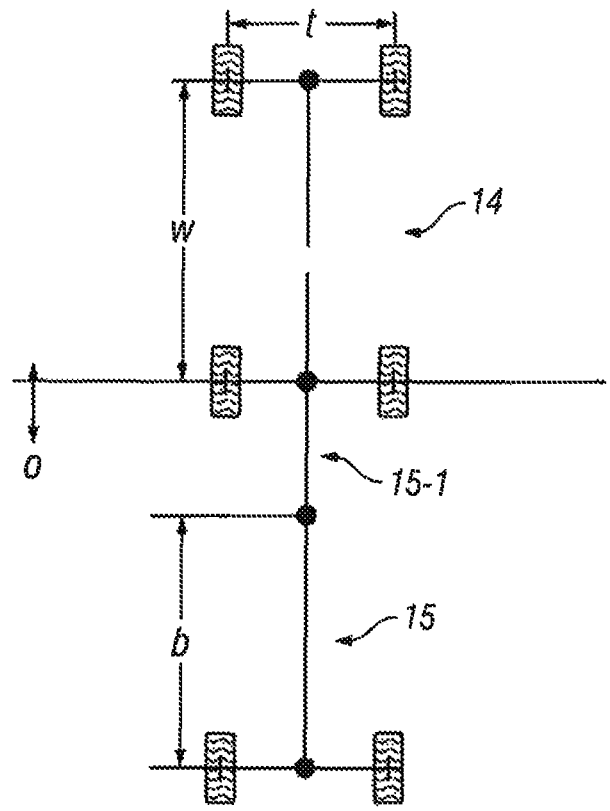
FIG. 4 is a diagrammatic view illustrating an example of the remote vehicle towing the trailer as shown in FIG. 1.

As shown in the flowchart of FIG. 3, the controller 22 of the vehicle monitoring system 12 on the host vehicle 10 receives data provided by, for example, the global positioning system (GPS) 26 of the host vehicle 10 in Step S1. Then, the controller 22 using the GPS data determines a current vehicle location of the host vehicle 10 in Step S2. Next, the controller 22 using the GPS data and map data determines the current vehicle heading of the host vehicle 10 in Step S3. The controller 22 of the vehicle monitoring system 12, for example, receives and decodes BSM data from the remote vehicle 14 via vehicle-to-vehicle communication as discussed herein in Step S4. The controller 22 uses the BSM data, along with any other data described herein, to calculate a warning box surrounding the remote vehicle 14 and the trailer 15 in Step S5 as discussed below. The controller 22 of the vehicle monitoring system 12, for example, also uses the BSM data and any other data described herein to calculate a path of the remote vehicle 14 and the trailer 15 in Step S5.

The motion of the trailer 15 depends on several factors defined in Table 1 below.

TABLE 1

| Trailer Motion Factors | |
|---|---|
| Curve Radius | $r_d$ |
| Wheel Base | w |
| Track Width | $t_v$ |
| Steering Angle | $\delta_s$ |
| Wheel Rotations | n |
| Wheel Diameter | $\tau$ |
| Vehicle Heading | $\eta$ |
| Trailer Length | l |
| Trailer Axle to Hitch | b |
| Trailer Heading Angle | $\theta_t$ |
| Trailer Track Width | $t_t$ |
| RV Reference Point (RP) to end of trailer | $T_d$ |
| Distance from HV Reference Point (RP) to Hitch | $V_d$ |

If the host vehicle 10 encroaches upon the space where the trailer 15 of the remote vehicle 14 is or will be present, the potential for contact between the host vehicle 10 and the trailer 15 exists. Under these circumstance, it is desirable to warn the driver of the host vehicle 10. To accomplish this warning, data from the remote vehicle 14, regarding the trailer dimensions, steering angle, heading, and dimensions of the remote vehicle 14, along with several other variables as described below, are provided to the controller, generally disposed on the host vehicle 10. In this embodiment such communication is performed by wireless transmission via vehicle-to-vehicle communication as discussed herein. The vehicle monitoring system 12 of the host vehicle 10 will use this information to calculate a potential contact zone defined below. The vehicle monitoring system 12 can also use this information to predict the path of the tractor-trailer system including the remote vehicle 14 and the trailer 15, and thus provide a warning to the driver of the host vehicle 10 when appropriate.

Figure 5:
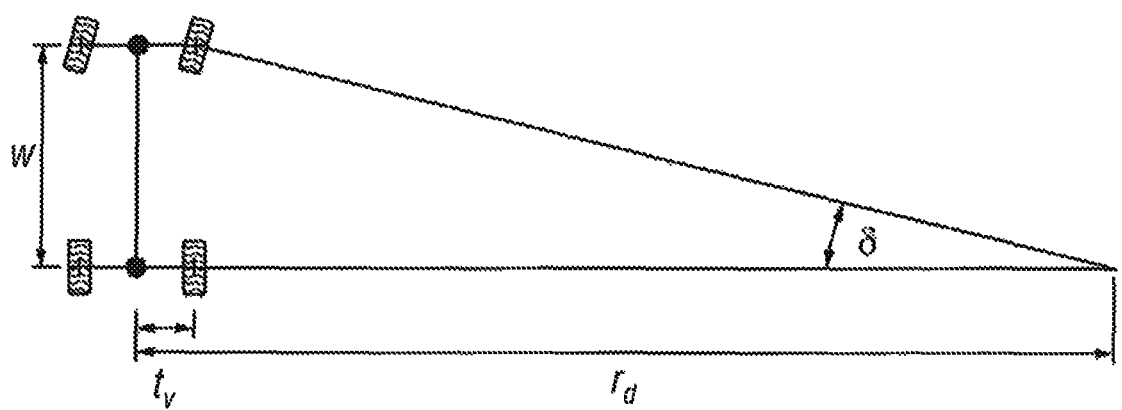
FIG. 5 is a geometric representation of an example of a steering model pertaining to the remote vehicle.

The parameters defined above are used to relate steering angle to the vehicle heading angle through the following process, which will be described with reference to FIGS. 4 through 14. The first step is to define a curve radius $r_d$ as shown in FIG. 5.

$$r_d = \frac{w}{\tan(\delta_s)} + t_v$$

The radius $r_d$ can be defined by realizing that $$n\tau\pi = r_d \eta$$

and solving for $r_d$ yields:

$$r_d = \frac{n\tau\pi}{\eta}$$

The first and third equations are substituted for $r_d$ to obtain:

$$\frac{n\tau\pi}{\eta} = \frac{w}{\tan(\delta_s)} + t_v$$

which is solved in terms of the heading angle to obtain:

$$\eta = \frac{n\tau\pi \tan(\delta_s)}{w + t_v \tan(\delta_s)}$$

As discussed above with regard to FIGS. 1 and 2, the remote vehicle 14 is equipped with a GPS antenna 26A. From the location of the GPS antenna 26A, the Reference Point (RP) of the remote vehicle 14 can be obtained. The location of the trailer hitch 15-1 based on this point can thus be determined by $$d_H = RP - l\sin(\eta)\hat{i} - l\cos(\eta)\hat{j}$$

Assuming that the RP of the remote vehicle 14 is displaced by an infinitesimally small distance, a, the angle, $\phi$, subtended by a can then be derived as follows.

$$\phi = 2\sin^{-1}\left(\frac{a}{2r_d}\right)$$

The trailer hitch 15-1 is not located at the RP of the remote vehicle 14, thus indicating that the turning radius of the trailer hitch 15-1 is different than the turning radius of the RP of the remote vehicle 14. The turning radius of the trailer hitch 15-1 can therefore be calculated as $$r_h = \sqrt{l^2 + \left(\frac{w}{\tan(\delta_s)} + t_v\right)^2}$$

The angle $\theta$ is the same for both RP of the remote vehicle 14 and trailer hitch 15-1, but the distance traveled by the trailer hitch 15-1, $a_n$ will be different and can be derived as follows.

$$a_h = 2r_h \sin\left(\sin^{-1}\left(\frac{a}{2r_d}\right)\right) \text{ or } a_h = \frac{r_h}{r_d} a$$

From this equation, the trailer heading angle $\theta_r$ of the trailer 15 is calculated where $$\alpha = 180 - \theta_t$$

$$h = \sqrt{a_h^2 + l^2 - 2 * a_h * l \cos(\alpha)}$$

$$J = \text{Arcos}\left(\frac{h^2 + a_h^2 - l^2}{2 * h^2 * a_h^2}\right)$$

$$\theta_t = J * \frac{180}{\pi}$$

The X distance from the remote vehicle 14 reference point RP to the center of the rear of the trailer 15 is calculated as follows $$X = V_d \sin(\eta) + (b + T_d)\sin(\theta_{TA})$$

and similarly, Y can be obtained by:

$$Y = V_d \cos(\eta) + [(b + T_d)\cos(\theta_{TA})]$$

To portray the position of the trailer 15, the boundaries of the trailer 15 are found. This can be accomplished by first finding the four corners of the trailer 15. To find the X and Y distances to the passenger side corner of the remote vehicle 14, the following calculations are considered:

$$\phi = \theta_{HV} - 90 - \theta_n$$

$$P_{FX} = HV_{RPX} + (X + (\tfrac{1}{2} t_t \cos(\theta_{TA})))$$

$$P_{FY} = HV_{RPY} + (Y + (\tfrac{1}{2} t_t \sin(\theta_{TA})))$$

Similarly, the X and yY distances to driver side corner of the remote vehicle 14 is obtained by:

$$P_{FX} = HV_{RPX} + (X + (\tfrac{1}{2} t_t \cos(\theta_{TA})))$$

$$P_{FY} = HV_{RPY} + (Y + (\tfrac{1}{2} t_t \sin(\theta_{TA})))$$

To further portray the position of the trailer 15, two more points are established to create a line that is parallel to line Ti, and the same length as line TL. These lines will start at $(P_{FX}, P_{FY})$ and $(D_{FX}, D_{FY})$. The lines will end nearer to the remote vehicle 14 at designated points $(P_{CX}, P_{CY})$ and $(D_{CX}, D_{CY})$ with $$P_{CX} = P_{FX} - X$$

$$P_{CY} = P_{FY} - ((T_a + T_d)\cos(\theta_{TA}))$$

$$D_{CX} = D_{FX} - X$$

$$D_{CY} = D_{FY} - ((T_a + T_d)\cos(\theta_{TA}))$$

The X and Y distances from the RP of the remote vehicle 14 to the center of the front edge of the remote vehicle 14 are calculated. The calculations from the center of the front bumper to the driver side corner of the remote vehicle 14 as are follows:

$$X_{HV} = HV_Y \sin(\theta_{HV})$$

$$Y_{HV} = HV_Y \cos(\theta_{HV})$$

These distances can then be used to calculate the X and Y distances to the front corners of the remote vehicle 14 as follows:

$$C_{DX} = X_{HV} - (\tfrac{1}{2} HV_X \cos(\theta_{HV1})) \quad 0 < \theta_{HV} < 90$$

$$C_{DY} = X_{HV} + (\tfrac{1}{2} HV_Y \sin(\theta_{HV1})) \quad 0 < \theta_{HV} < 90$$

$$C_{DX} = X_{HV} + (\tfrac{1}{2} HV_X \sin(\theta_{HV2})) \quad 90 < \theta_{HV} < 180$$

$$C_{DY} = X_{HV} + (\tfrac{1}{2} HV_Y \cos(\theta_{HV2})) \quad 90 < \theta_{HV} < 180$$

$$C_{DX} = X_{HV} + (\tfrac{1}{2} HV_X \sin(\theta_{HV3})) \quad 180 < \theta_{HV} < 270$$

$$C_{DY} = X_{HV} - (\tfrac{1}{2} HV_Y \cos(\theta_{HV3})) \quad 180 < \theta_{HV} < 270$$

$$C_{DX} = X_{HV} - (\tfrac{1}{2} HV_X \sin(\theta_{HV4})) \quad 270 < \theta_{HV} < 360$$

$$C_{DY} = X_{HV} - (\tfrac{1}{2} HV_Y \cos(\theta_{HV4})) \quad 270 < \theta_{HV} < 360$$

The following equations represent the calculations for the passenger side corner of the front of the remote vehicle 14 and are opposite to those of the driver side corner:

$$C_{PX} = X_{HV} - (\tfrac{1}{2} HV_X \sin(\theta_{HV1})) \quad 0 < \theta_{HV} < 90$$

$$C_{PY} = X_{HV} - (\tfrac{1}{2} HV_Y \cos(\theta_{HV1})) \quad 0 < \theta_{HV} < 90$$

$$C_{PX} = X_{HV} - (\tfrac{1}{2} HV_X \sin(\theta_{HV2})) \quad 90 < \theta_{HV} < 180$$

$$C_{PY} = X_{HV} - (\tfrac{1}{2} HV_Y \cos(\theta_{HV2})) \quad 90 < \theta_{HV} < 180$$

$$C_{PX} = X_{HV} - (\tfrac{1}{2} HV_X \sin(\theta_{HV3})) \quad 180 < \theta_{HV} < 270$$

$$C_{PY} = X_{HV} + (\tfrac{1}{2} HV_Y \cos(\theta_{HV3})) \quad 180 < \theta_{HV} < 270$$

$$C_{PX} = X_{HV} + (\tfrac{1}{2} HV_X \sin(\theta_{HV4})) \quad 270 < \theta_{HV} < 360$$

$$C_{PY} = X_{HV} + (\tfrac{1}{2} HV_Y \cos(\theta_{HV4})) \quad 270 < \theta_{HV} < 360$$

The two rear corners of the remote vehicle 14 are obtained from the following expressions:

$$C_{PXR} = X_{HV} - (\tfrac{1}{2} HV_X \sin(\theta_{HV1})) \quad 0 < \theta_{HV} < 90$$

$$C_{PYR} = X_{HV} + (\tfrac{1}{2} HV_{Y2} \cos(\theta_{HV1})) \quad 0 < \theta_{HV} < 90$$

$$C_{PXR} = X_{HV} + (\tfrac{1}{2} HV_X \sin(\theta_{HV2})) \quad 90 < \theta_{HV} < 180$$

$$C_{PYR} = X_{HV} + (\tfrac{1}{2} HV_{Y2} \cos(\theta_{HV2})) \quad 90 < \theta_{HV} < 180$$

$$C_{PXR} = X_{HV} + (\tfrac{1}{2} HV_X \sin(\theta_{HV3})) \quad 180 < \theta_{HV} < 270$$

$$C_{PYR} = X_{HV} - (\tfrac{1}{2} HV_{Y2} \cos(\theta_{HV3})) \quad 180 < \theta_{HV} < 270$$

$$C_{PXR} = X_{HV} - (\tfrac{1}{2} HV_X \sin(\theta_{HV4})) \quad 270 < \theta_{HV} < 360$$

$$C_{PYR} = X_{HV} - (\tfrac{1}{2} HV_{Y2} \cos(\theta_{HV4})) \quad 270 < \theta_{HV} < 360$$

Similarly, the calculations for the driver side of the remote vehicle 14 are as follows:

$$C_{DXR} = X_{HV} + (\tfrac{1}{2} HV_X \sin(\theta_{HV1})) \quad 0 < \theta_{HV} < 90$$

$$C_{DYR} = X_{HV} + (\tfrac{1}{2} HV_{Y2} \cos(\theta_{HV1})) \quad 0 < \theta_{HV} < 90$$

$$C_{DXR} = X_{HV} - (\tfrac{1}{2} HV_X \sin(\theta_{HV2})) \quad 90 < \theta_{HV} < 180$$

$$C_{DYR} = X_{HV} - (\tfrac{1}{2} HV_{Y2} \cos(\theta_{HV2})) \quad 90 < \theta_{HV} < 180$$

$$C_{DXR} = X_{HV} - (\tfrac{1}{2} HV_X \sin(\theta_{HV3})) \quad 180 < \theta_{HV} < 270$$

$$C_{DYR} = X_{HV} + (\tfrac{1}{2} HV_{Y2} \cos(\theta_{HV3})) \quad 180 < \theta_{HV} < 270$$

$$C_{DXR} = X_{HV} + (\tfrac{1}{2} HV_X \sin(\theta_{HV4})) \quad 270 < \theta_{HV} < 360$$

$$C_{DYR} = X_{HV} + (\tfrac{1}{2} HV_{Y2} \cos(\theta_{HV4})) \quad 270 < \theta_{HV} < 360$$

When defining the warning box, the front two corners of the remote vehicle 14 and the rear two corners of the trailer 15 are used. To warn of encroachment into the pocket of the trailer 15, the passenger side front corner and the passenger side rear corner of the trailer 15 are used to define the boundaries of the box when α is less than 180. For the driver side, the driver side rear corner of the remote vehicle 14 and the rear corner of the trailer 15 are connected in a line. The front driver corner of the remote vehicle 14 and the rear driver side corner of the remote vehicle 14 are also connected in a line.

For this methodology, the α angle, which is the angle between the remote vehicle 14 and the trailer 15, is defined as follows:

$$\alpha = 180 + \eta - \theta_t$$

As can be appreciated from the following description with reference to FIGS. 7 through 14, there are eight use cases in this example. These eight use cases include two cases for each ninety degree increment of the vehicle heading, and one case for α<180° and α>180°.

First Case η<90°, α<180°

Figure 7:
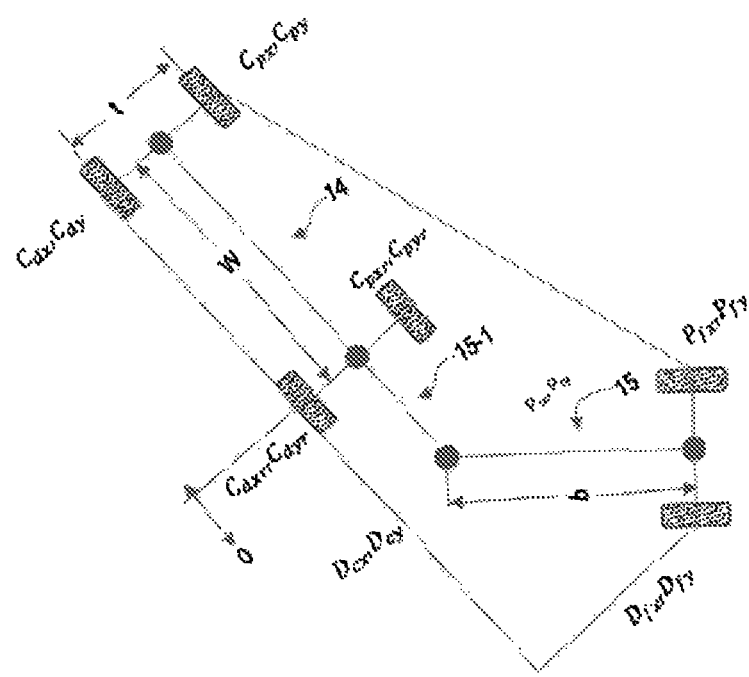
FIGS. 7 through 14 are diagrammatic views illustrating eight different examples of the relationship between the heading angle of the remote vehicle and the heading angle of the trailer being towed by the remote vehicle.
Figure 6:
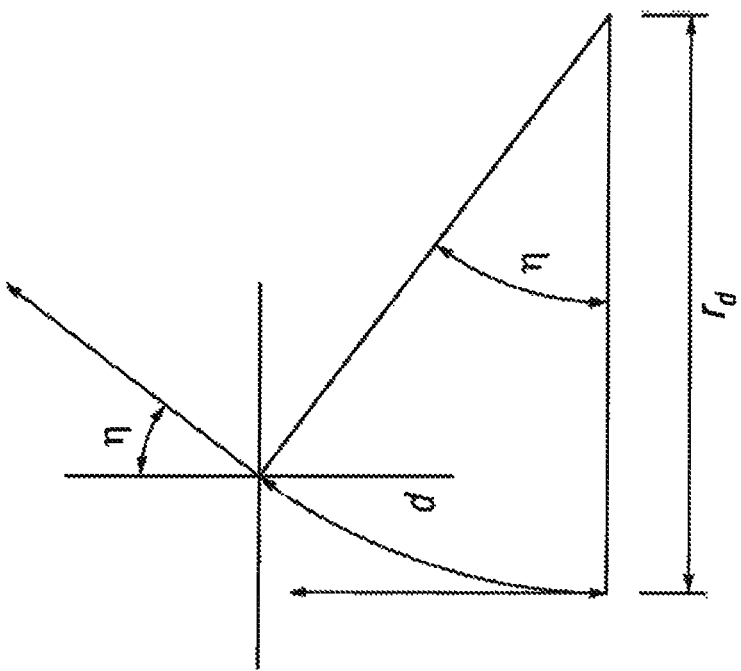
FIG. 6 is a geometric representation of an example of a curve radius which relates the steering angle of the remote vehicle to the vehicle heading angle.

FIG. 7 provides an exemplary illustration of the first case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CX} \text{ from } P_{FX} \geq D_{FX}$$

the passenger side is calculated as $$\frac{C_{PY} - P_{FY}}{C_{PX} - P_{FX}}(x - C_{PX}) + C_{PY} \text{ from } C_{PX} \geq P_{FX}$$

and the driver side is calculated as $$\frac{C_{DY} - C_{DYR}}{C_{DX} - C_{DXR}}(x - C_{DX}) + C_{CY} \text{ from } T_p \leq C_{DX}$$

$$\frac{C_{PY} - C_{DY}}{C_{PX} - C_{DX}}(x - D_{FX}) + D_{FY} \text{ from } T_p \leq D_{FX}$$

$T_p$ is defined where $$\frac{C_{PY} - C_{DY}}{C_{PX} - C_{DX}}(x - D_{FX}) + D_{FY} = \frac{C_{DY} - C_{DYR}}{C_{DX} - C_{DXR}}(x - C_{DX}) + C_{DY}$$

Second Case η<90°, α>180°

Figure 8:
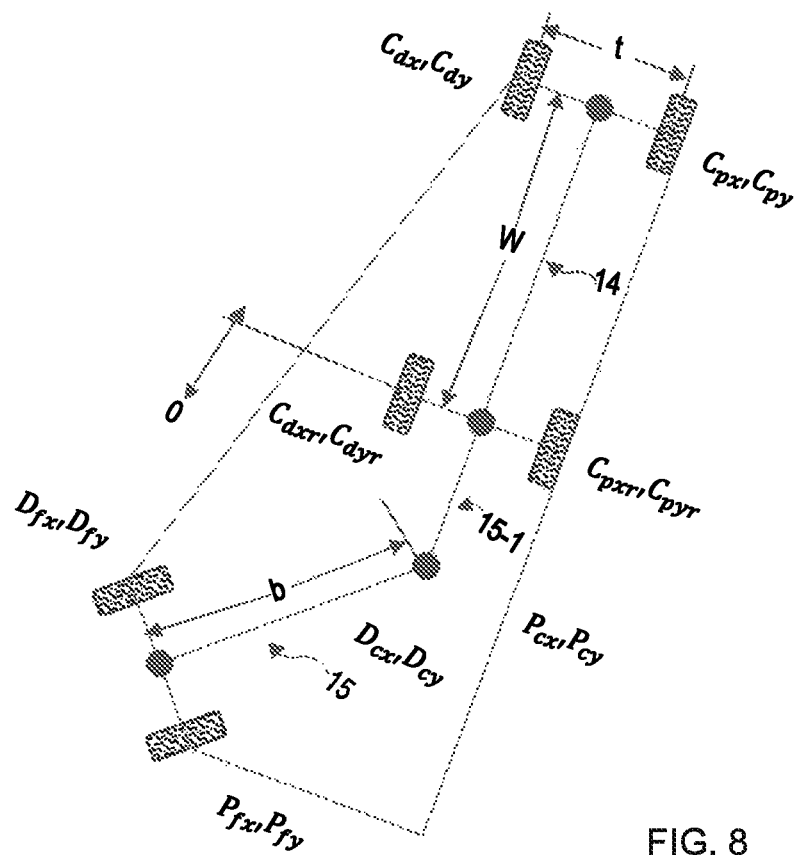

FIG. 8 provides an exemplary illustration of the second case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - C_{PYR}}{C_{PX} - C_{PXR}}(x - C_{PX}) + C_{PY} \text{ from } T_P \leq C_{PX}$$

$$\frac{C_{PY} - C_{DY}}{C_{PX} - C_{DX}}(x - P_{FX}) + P_{FY} \text{ from } T_P \leq P_{FX}$$

$T_p$ is defined where $$\frac{C_{PY} - C_{DY}}{C_{PX} - C_{DX}}(x - P_{FX}) + P_{FY} = \frac{C_{PY} - C_{PYR}}{C_{PX} - C_{PXR}}(x - C_{PX}) + C_{PY}$$

and the driver side is calculated as $$\frac{C_{PY} - P_{FY}}{C_{PX} - P_{FX}}(x - C_{PX}) + C_{PY} \text{ from } C_{PX} \geq P_{FX}$$

Third Case $90° < \eta < 180°$, $\alpha < 180°$

Figure 9:
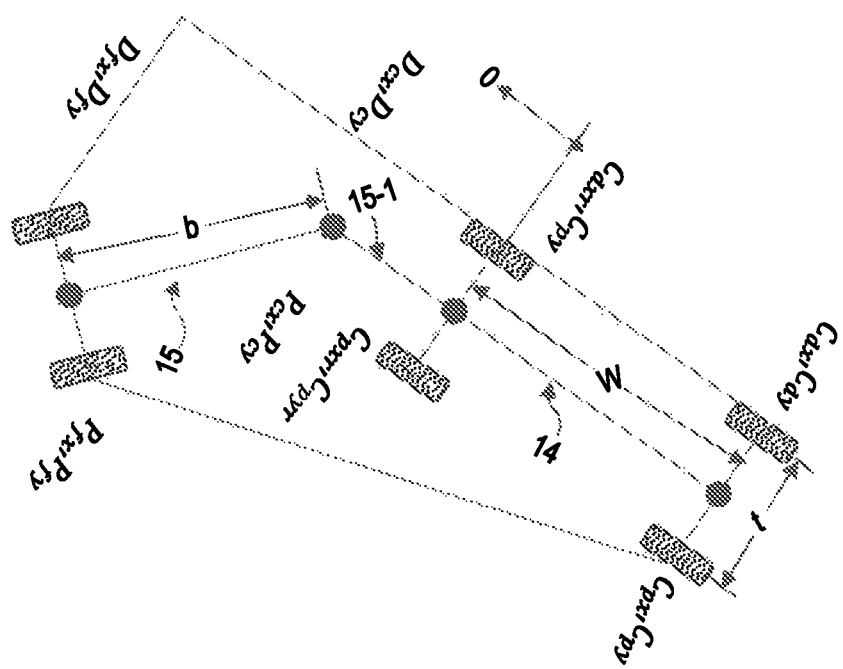

FIG. 9 provides an exemplary illustration of the third case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - P_{FY}}{C_{PX} - P_{FX}}(x - C_{PX}) + C_{PY} \text{ from } C_{PX} \geq P_{FX}$$

and the driver side is calculated as $$\frac{C_{DY} - C_{DYR}}{C_{DX} - C_{DXR}}(x - C_{DX}) + C_{DY} \text{ from } T_P \leq C_{DX}$$

$$\frac{C_{PY} - C_{DY}}{C_{PX} - C_{DX}}(x - D_{FX}) + D_{FY} \text{ from } T_P \leq D_{FX}$$

$T_p$ is defined where $$\frac{C_{PY} - C_{DY}}{C_{PX} - C_{DX}}(x - D_{FX}) + D_{FY} = \frac{C_{DY} - C_{DYR}}{C_{DX} - C_{DXR}}(x - C_{DX}) + C_{DY}$$

Fourth Case $90° < \eta < 180°$, $\alpha > 180°$

Figure 10:
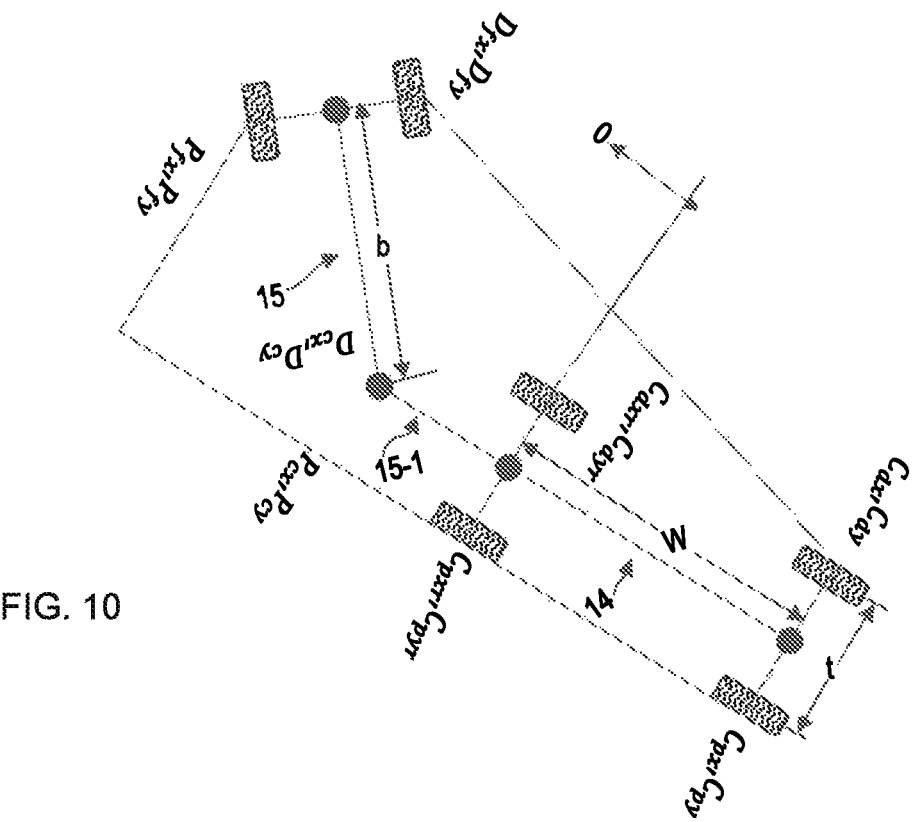

FIG. 10 provides an exemplary illustration of the fourth case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - C_{PYR}}{C_{PX} - C_{PXR}}(x - C_{PX}) + C_{PY} \text{ from } T_P \leq C_{PX}$$

$$\frac{C_{PY} - C_{DY}}{C_{PX} - C_{DX}}(x - P_{FX}) + P_{FY} \text{ from } T_P \leq P_{FX}$$

$T_p$ is defined where $$\frac{C_{PY} - C_{DY}}{C_{PX} - C_{DX}}(x - P_{FX}) + P_{FY} = \frac{C_{PY} - C_{PYR}}{C_{PX} - C_{PXR}}(x - C_{PX}) + C_{PY}$$

and the driver side is calculated as $$\frac{C_{PY} - P_{FY}}{C_{PX} - P_{FX}}(x - C_{PX}) + C_{PY} \text{ from } C_{PX} \geq P_{FX}$$

Fifth Case $180° < \eta < 270°$, $\alpha < 180°$

Figure 11:
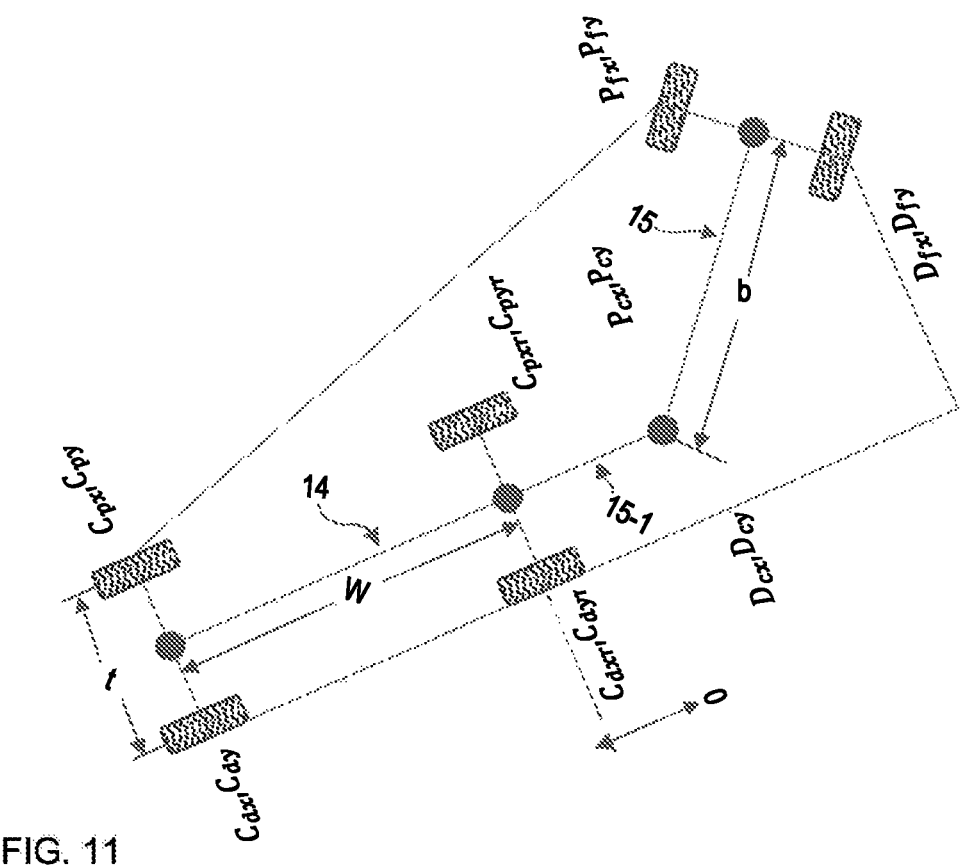

FIG. 11 provides an exemplary illustration of the fifth case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - P_{FY}}{C_{PX} - P_{FX}}(x - C_{PX}) + C_{PY} \text{ from } C_{PX} \geq P_{FX}$$

and the driver side is calculated as $$\frac{C_{DY} - C_{DYR}}{C_{DX} - C_{DXR}}(x - C_{DX}) + C_{DY} \text{ from } T_P \leq C_{DX}$$

$$\frac{C_{PY} - C_{DY}}{C_{PX} - C_{DX}}(x - D_{FX}) + D_{FY} \text{ from } T_P \leq D_{FX}$$

$T_p$ is defined where $$\frac{C_{PY} - C_{DY}}{C_{PX} - C_{DX}}(x - D_{FX}) + D_{FY} = \frac{C_{DY} - C_{DYR}}{C_{DX} - C_{DXR}}(x - C_{DX}) + C_{DY}$$

Sixth Case $180° < \eta < 270°$, $\alpha > 180°$

Figure 12:
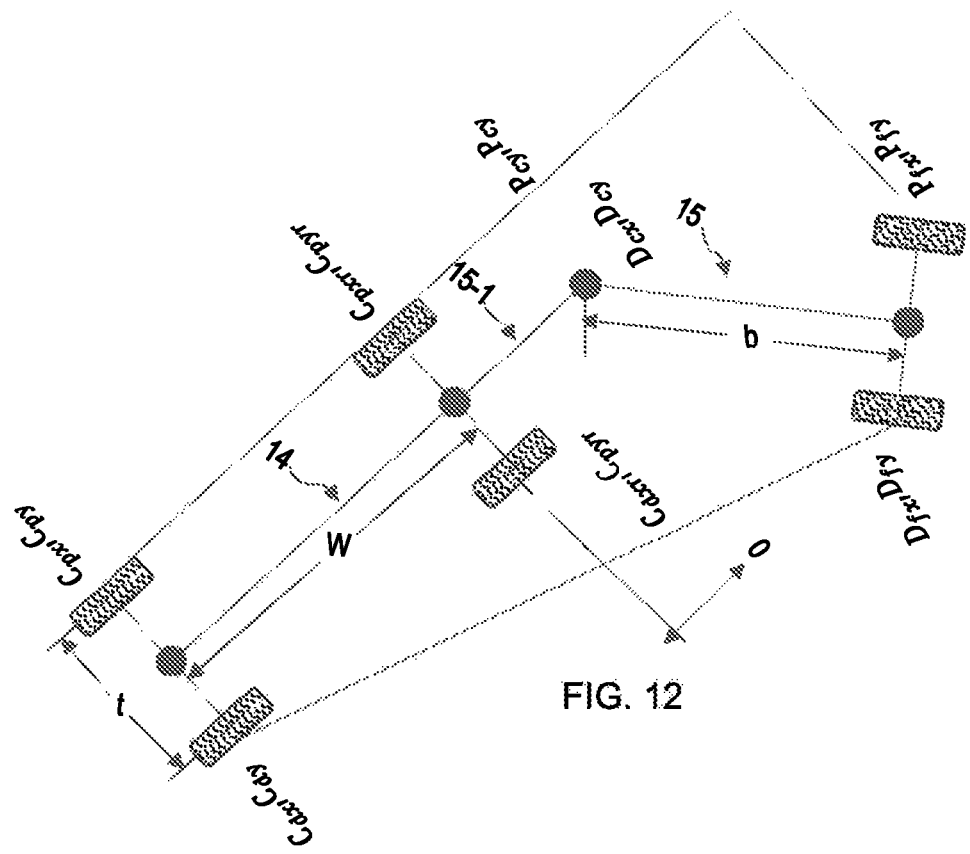

FIG. 12 provides an exemplary illustration of the sixth case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - C_{PYR}}{C_{PX} - C_{PXR}}(x - C_{PX}) + C_{PY} \text{ from } T_p \leq C_{PX}$$
$$\frac{C_{PY} - C_{DY}}{C_{PX} - C_{DX}}(x - P_{FX}) + P_{FY} \text{ from } T_p \leq P_{FX}$$

$T_p$ is defined where $$\frac{C_{PY} - C_{DY}}{C_{PX} - C_{DX}}(x - P_{FX}) + P_{FY} = \frac{C_{PY} - C_{PYR}}{C_{PX} - C_{PXR}}(x - C_{PX}) + C_{PY}$$

and the driver side is calculated as $$\frac{C_{PY} - C_{FY}}{C_{PX} - P_{FX}}(x - C_{PX}) + C_{PY} \text{ from } C_{PX} \geq P_{FX}$$

Seventh Case $270° < r_i < 360°$, $\alpha < 180°$

Figure 13:
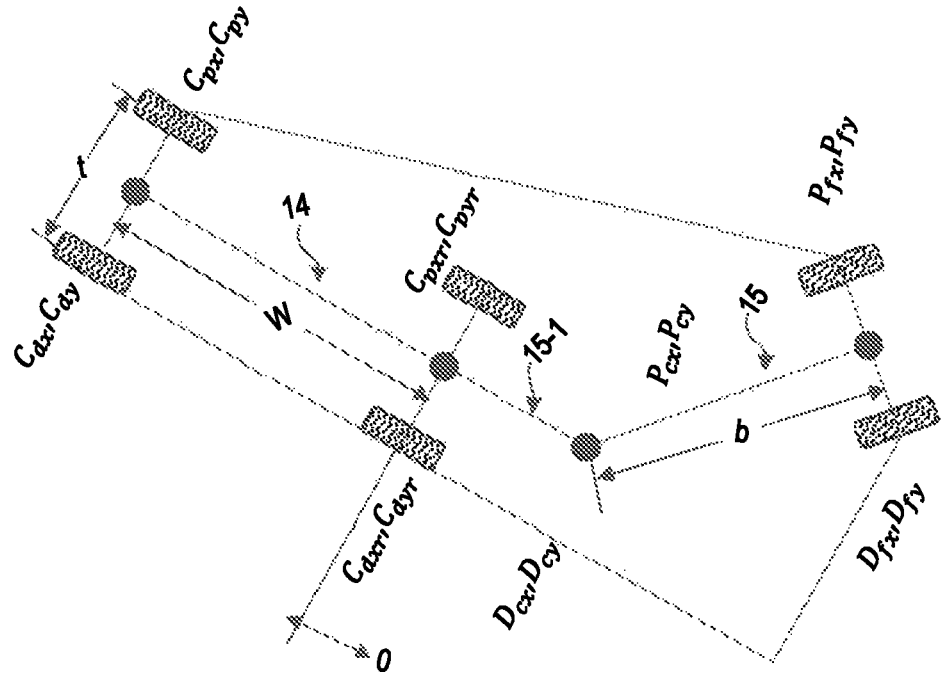

FIG. 13 provides an exemplary illustration of the seventh case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - P_{FY}}{C_{PX} - P_{FX}}(x - C_{PX}) + C_{PY} \text{ from } C_{PX} \geq P_{FX}$$

and the driver side is calculated as $$\frac{C_{DY} - C_{DYR}}{C_{DX} - C_{DXR}}(x - C_{DX}) + C_{DY} \text{ from } T_p \leq C_{DX}$$
$$\frac{C_{PY} - C_{DY}}{C_{PX} - C_{DX}}(x - D_{FX}) + D_{FY} \text{ from } T_p \leq D_{FX}$$

$T_p$ is defined where $$\frac{C_{PY} - C_{DY}}{C_{PX} - C_{DX}}(x - D_{FX}) + D_{FY} = \frac{C_{DY} - C_{DYR}}{C_{DX} - C_{DXR}}(x - C_{DX}) + C_{DY}$$

Eighth Case $270° < \eta < 360°$, $\alpha > 180°$

Figure 14:
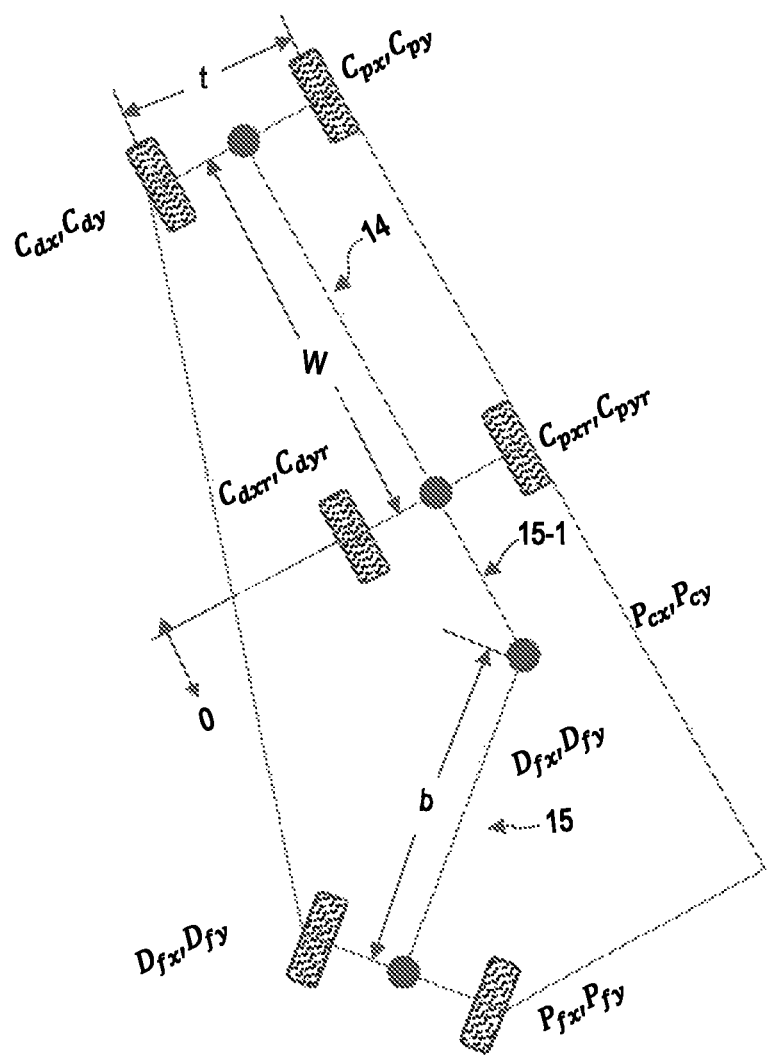

FIG. 14 provides an exemplary illustration of the eighth case. The front edge is calculated as $$\frac{C_{PY} - C_{DY}}{C_{PX} - C_{DX}}(x - C_{PX}) + C_{PY} \text{ from } C_{PX} \geq C_{DX}$$

the rear edge is calculated as $$\frac{D_{CY} - P_{FY}}{D_{CX} - P_{FY}}(x - D_{CX}) + D_{CY} \text{ from } P_{FX} \geq D_{FX}$$

the passenger side is calculated as $$\frac{C_{PY} - C_{PYR}}{C_{PX} - C_{PXR}}(x - C_{PX}) + C_{PY} \text{ from } T_p \leq C_{PX}$$
$$\frac{C_{PY} - C_{DY}}{C_{PX} - C_{DX}}(x - P_{FX}) + P_{FY} \text{ from } T_p \leq P_{FX}$$

$T_p$ is defined where $$\frac{C_{PY} - C_{DY}}{C_{PX} - C_{DX}}(x - P_{FX}) + P_{FY} = \frac{C_{PY} - C_{PYR}}{C_{PX} - C_{PXR}}(x - C_{PX}) + C_{PY}$$

and the driver side is calculated as $$\frac{C_{PY} - P_{FY}}{C_{PX} - P_{FX}}(x - C_{PX}) + C_{PY} \text{ from } C_{PX} \geq P_{FX}$$

With the warning box now defined as described above, following calculations can be performed to determine if the host vehicle 10 will encroach upon the defined warning box.

Figure 15:
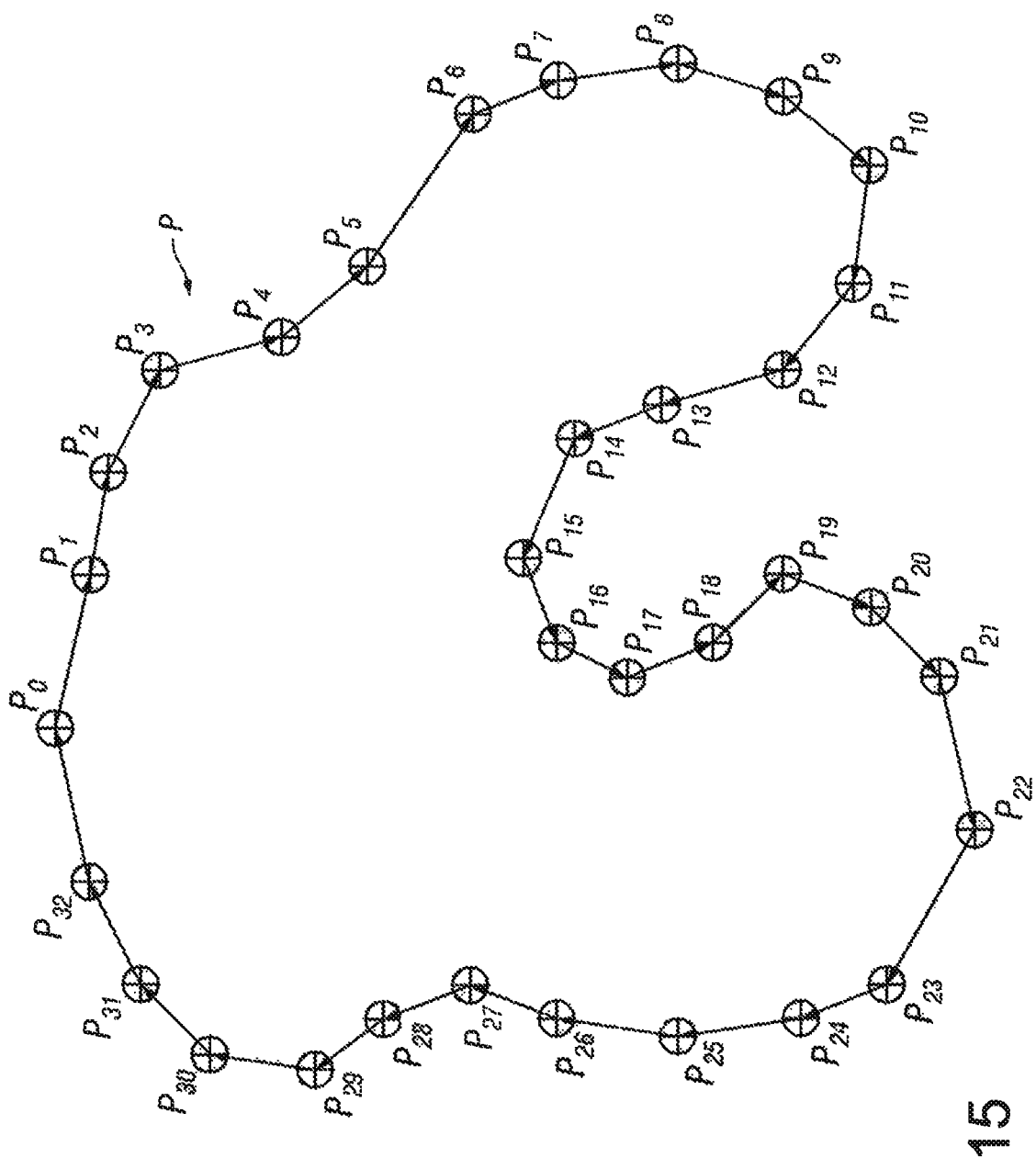
FIG. 15 is a diagrammatic view illustrating an example of an area of interest, such as an area surrounding the remote vehicle and the trailer being towed by the remote vehicle, that represents a relationship between a plurality of vehicle-related parameters and a vehicle condition, and which is evaluated according to the embodiments described herein.

As now will be described with regard to FIGS. 15 through 29, the perimeter of any two-dimensional area, regardless of shape, describes a 360-degree path where the start and end points are the same. This principle is the basis of a method described here to determine whether some point, k will fall inside the area encompassed by the path P. Any path P that encircles a two-dimensional area can be defined by a series of points along the path P as shown in FIG. 15. The number of points used to define the path P is immaterial, and as many points as needed to accurately define the path P can be used for purposes of this example, the direction taken along the path P is clockwise. However, the direction could also be taken counterclockwise.

Figure 16:
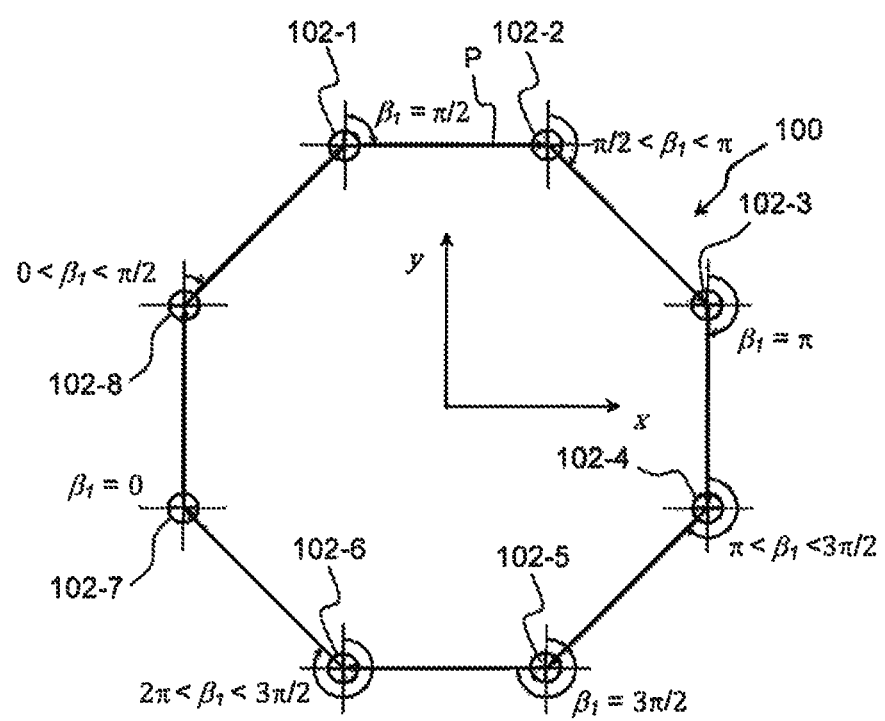
FIG. 16 is another diagrammatic view illustrating an example of an area of interest, such as an area surrounding the remote vehicle and the trailer being towed by the remote vehicle, that represents a relationship between a plurality of vehicle-related parameters and a vehicle condition, and which is evaluated according to the embodiments described herein.

As can be appreciated by one skilled in the art, the line segment between two consecutive points on a path, such as path P, can be characterized in one of eight ways as shown, for example, in FIG. 16. For purposes of this example, FIG. 16 illustrates an area of interest 100 that is defined by a plurality of boundary points 102. For instance, the area of interest 100 can be a particularly complex area defined by scattered boundary points that define a complex boundary that can vary in an irregular, non-symmetrical manner as defined by the boundary points 102. The boundary points 102 can be represented by, for example, a series of experimental and/or historical data points. The boundary points 102 can be represented by, for example, data sets (e.g., x, y coordinates) that represent a relationship between vehicle-related parameters, such as those discussed herein. The data sets are stored in the database of the data storage device 28 or otherwise provided to the vehicle monitoring system 12 via the wireless communications network in any suitable manner. In another example, the boundary points 102 can be represented by, for example, longitude and latitude data sets (e.g., x, y coordinates) that are stored in the database of the data storage device 28 or otherwise provided to the vehicle monitoring system 12 via the wireless communications network 16 or in any suitable manner. Also, the area of interest 100 can be either a dynamic area that changes or a static area that remains stationary as shown in FIG. 7. The number of boundary points 102 and the distance between the boundary points 102 for any given one of the areas of interest 100 can vary as needed and/or desired to accomplish the desired result of the application in which the system is being used.

As can be appreciated from FIG. 16 and the following description, a line segment between two adjacent boundary points 102 can be characterized by an angle flu between the line segment and a predetermined direction. Mathematically, the angle flu can be expressed as follows:

$$\beta_1 = \pi \left( \frac{x_m - x_{m+1} + \sigma}{|x_m - x_{m+1}| + \sigma} + 1 \right) - \cos^{-1}\left( \frac{y_{m+1} - y_m}{\sqrt{(x_{m+1} - x_m)^2 + (y_{m+1} - y_m)^2}} \right)\left( \frac{x_m - x_{m+1} + \sigma}{|x_m - x_{m+1}| + \sigma} \right)$$

The length of the line $l_k$ between two consecutive points is a straight line defined as follows:

$$l_k = \sqrt{(x_{m+1} - x_m)^2 + (y_{m+1} - y_m)^2}$$

For purposes of this description, the position of the host vehicle 10 can be defined by a variable, k. It is desirable to know whether k, and thus, the host vehicle 10 itself, will encroach within the boundary defined by the warning box surrounding the remote vehicle 14 and the trailer 15 which has been defined as described above. This determination can be made by according to the following steps:

The controller 22 of the vehicle monitoring system 12, for example, on the host vehicle 10 can determine the point, $p_m$ (with coordinates $x_m$ and $y_m$) on the path that is closest to k (with coordinates $x_k$ and $y_k$) by calculating the straight-line distance between each point on the path and k then choosing the shortest line. This distance, $l_{m+1}$ is defined as follows:

$$l_{m+1} = \sqrt{(x_k - x_m)^2 + (y_k - y_m)^2}$$

Figure 17:
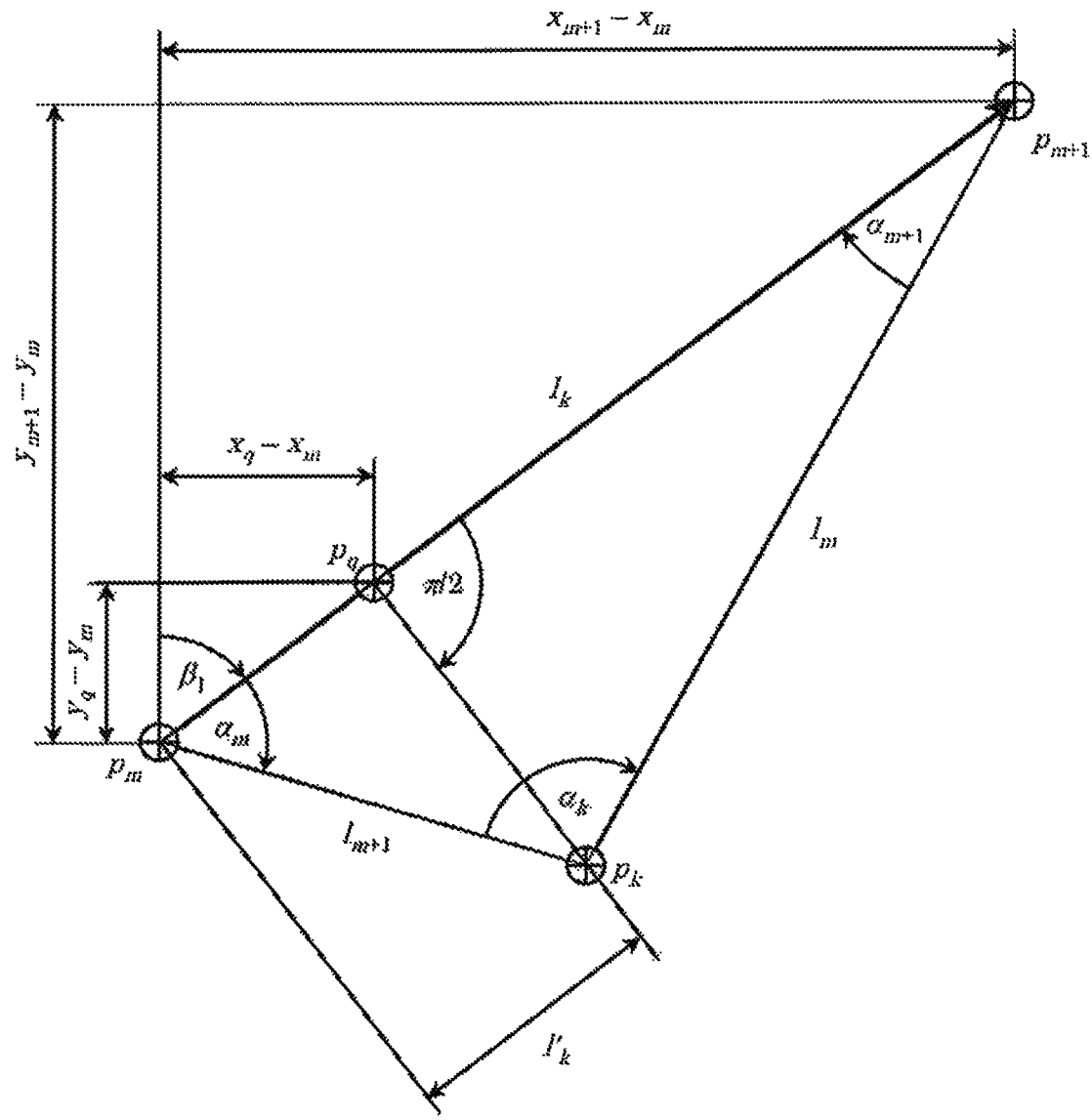
FIGS. 17-29 are diagrammatic views illustrating examples of the relationships between the determined values and boundary points defining the area of interest as used in accordance with the process shown in the flowchart of FIG. 3.

After the point on the path P that is closest to k has been identified, the processing generates via the controller 22 geometric data representing a geometric relationship between the first boundary point $p_m$, k and a second boundary point of the boundary points as will now be described. That is, the next consecutive point $p_{m+1}$ in the predetermined direction along the path is chosen and a triangle is defined as shown in FIG. 17, where:

$$l_k = \sqrt{(x_{m+1} - x_m)^2 + (y_{m+1} - y_m)^2}$$

$$l_m = \sqrt{(x_{m+1} - x_k)^2 + (y_{m+1} - y_k)^2}$$

$$l_{m+1} = \sqrt{(x_m - x_k)^2 + (y_m - y_k)^2}$$

and from the Law of Cosines $$\cos\alpha_k = \frac{l_m^2 + l_{m+1}^2 - l_k^2}{2l_m l_{m+1}}$$

$$\cos\alpha_m = \frac{l_k^2 + l_{m+1}^2 - l_m^2}{2l_k l_{m+1}}$$

$$\cos\alpha_{m+1} = \frac{l_k^2 + l_m^2 - l_{m+1}^2}{2l_k l_m}.$$

Different Cases 1 through 4 will now be described with reference to FIGS. 18 through 21 which indicate different possible relationships between the lines $l_k$, $l_m$ and $l_{m+1}$ identified in FIG. 17.

Case 1: $l_k^2 + l_{m+1}^2 - l_m^2 \geq 0$

Figure 18:
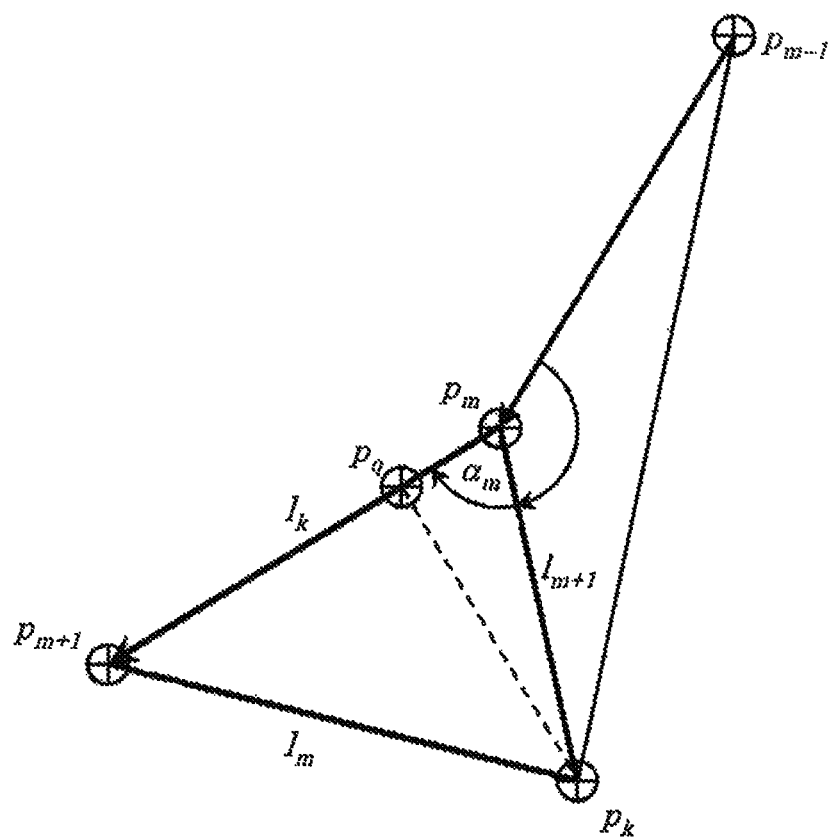
Figure 19:
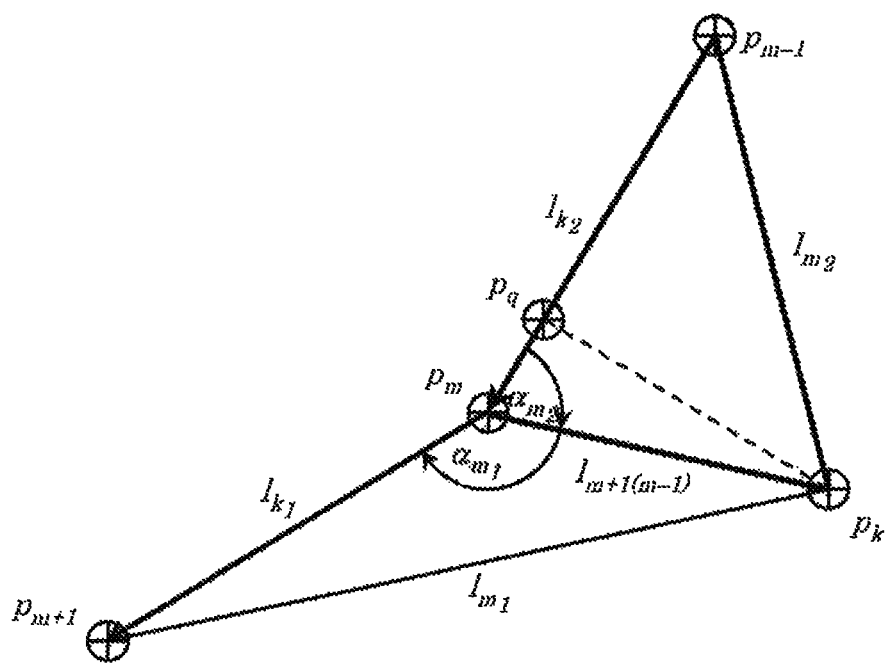

Referring to FIG. 18, if $l_k^2 + l_{m+1}^2 - l_m^2 \geq 0$, $\cos\alpha_m$ is greater than 0 and the coordinates $x_q$ and $y_q$ are calculated as follows:

The value of $x_q$ is determined follows:

First:

$$l'_k = l_{m+1} \cos\alpha_m = l_{m+1} \frac{l_k^2 + l_{m+1}^2 - l_m^2}{2l_k l_{m+1}} = \frac{l_k^2 + l_{m+1}^2 - l_m^2}{2l_k}$$

Now:

$$x_q - x_m = l'_k \sin\beta_1$$

where $$\sin\beta_1 = \frac{x_{m+1} - x_m}{l_k}$$

and substitutions are made to obtain:

$$x_q - x_m = \frac{l_k^2 + l_{m+1}^2 - l_m^2}{2l_k}\left(\frac{x_{m+1} - x_m}{l_k}\right)$$

$$x_q - x_m = \left(1 + \frac{l_{m+1}^2 - l_m^2}{l_k^2}\right)\left(\frac{x_{m+1} - x_m}{2}\right)$$

$$x_q - x_m = \frac{x_{m+1} - x_m}{2} + \left(\frac{l_{m+1}^2 - l_m^2}{l_k^2}\right)\left(\frac{x_{m+1} - x_m}{2}\right)$$

$$x_q = \frac{x_{m+1} + x_m}{2} + \left(\frac{l_{m+1}^2 - l_m^2}{l_k^2}\right)\left(\frac{x_{m+1} - x_m}{2}\right)$$

which are expanded to obtain:

$$x_q = \frac{x_{m+1} + x_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{x_{m+1} - x_m}{2}\right)$$

The value of $y_q$ is determined as follows:

$$y_q - y_m = l'_k \cos \beta_1$$

where:

$$\cos \beta_1 = \frac{y_{m+1} - y_m}{l_k}$$

and substitutions are made to obtain:

$$y_q - y_m = \frac{l_k^2 + l_{m+1}^2 - l_m^2}{2l_k}\left(\frac{y_{m+1} - y_m}{l_k}\right)$$

$$y_q - y_m = \left(1 + \frac{l_{m+1}^2 - l_m^2}{l_k^2}\right)\left(\frac{y_{m+1} - y_m}{2}\right)$$

$$y_q - y_m = \frac{y_{m+1} - y_m}{2} + \left(\frac{l_{m+1}^2 - l_m^2}{l_k^2}\right)\left(\frac{y_{m+1} - y_m}{2}\right)$$

$$y_q = \frac{y_{m+1} + y_m}{2} + \left(\frac{l_{m+1}^2 - l_m^2}{l_k^2}\right)\left(\frac{y_{m+1} - y_m}{2}\right)$$

which are expanded to obtain:

$$y_q = \frac{y_{m+1} + y_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{y_{m+1} - y_m}{2}\right)$$

Case 2: $l_k^2 + l_{m+1}^2 - l_m^2 \geq 0$, and $l_k^2 + l_{m-1}^2 - l_m^2 \geq 0$ Referring to FIG. 19, if $l_k^2 + l_{m+1}^2 - l_m^2 < 0$ (i.e. $\cos \alpha_{m1} < 0$) but $l_k^2 + l_{m-1}^2 - l_m^2 \geq 0$ (i.e. $\cos \alpha_{m1} > 0$), $p_m$ becomes $p_{m+1}$ and $p_{m-1}$ becomes $p_m$ and $x_q$ and $y_q$ are calculated in the same way as previously.
Thus:

$$x_q = \frac{x_{m+1} + x_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{x_{m+1} - x_m}{2}\right)$$

And $$y_q = \frac{y_{m+1} + y_m}{2} + \left(\frac{(x_m - x_k)^2 + (y_m - y_k)^2 - (x_{m+1} - x_k)^2 - (y_{m+1} - y_k)^2}{(x_{m+1} - x_m)^2 + (y_{m+1} - y_m)^2}\right)\left(\frac{y_{m+1} - y_m}{2}\right)$$

Case 3: $l_k^2 + l_{m+1}^2 - l_m^2 < 0$ and $l_k^2 + l_{m-1}^2 - l_m^2 < 0$

Figure 20:
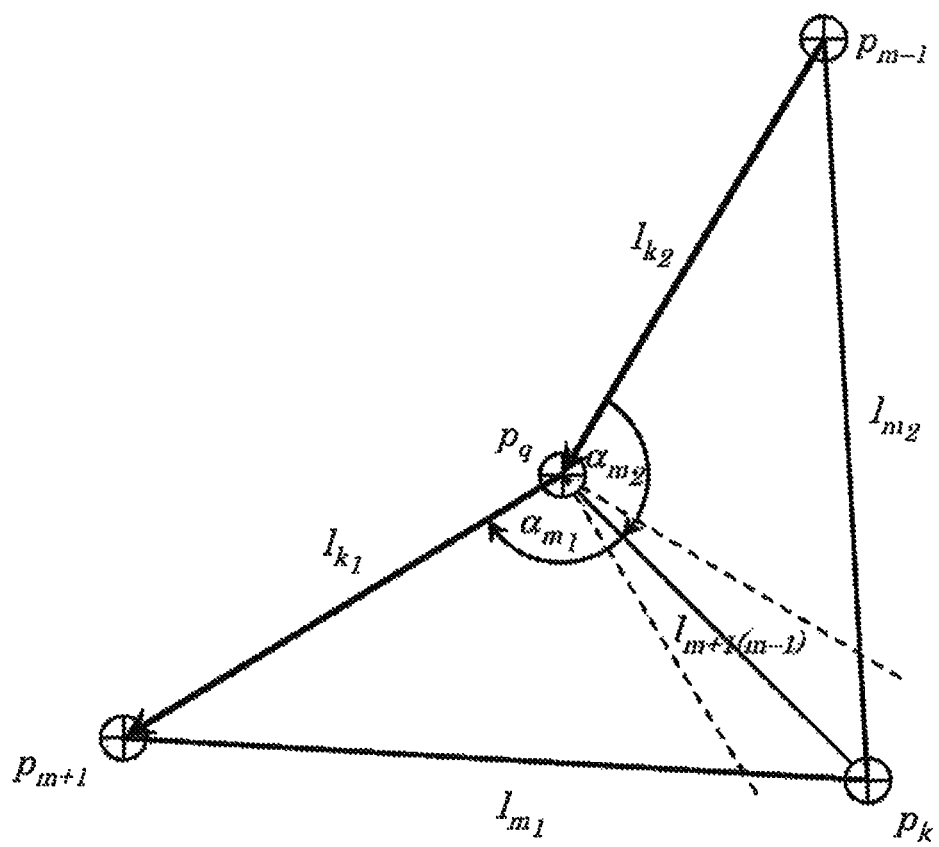
Figure 21:
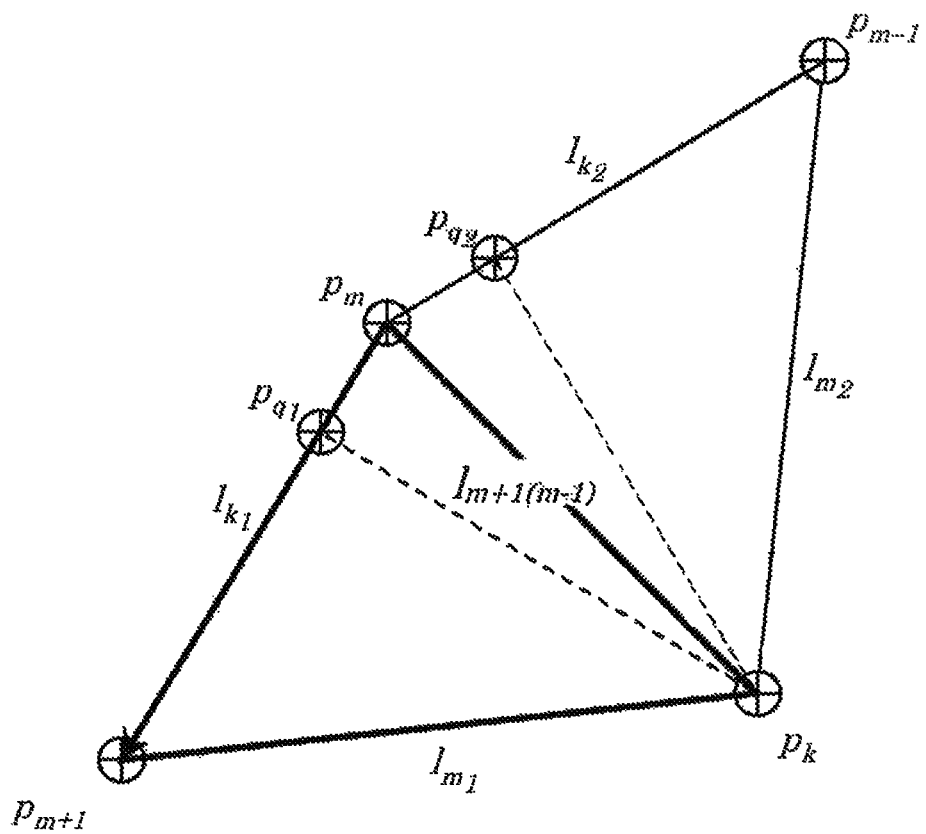

Referring to FIG. 20, it is possible that $l_k^2 + l_{m-1}^2 - l_m^2 \geq 0$ and $l_k^2 + l_{m-1}^2 - l_m^2 \geq 0$ (i.e. $\cos \alpha_{m1}$ and $\cos \alpha_{m2} < 0$). In this case, $p_m$ becomes $p_q$ Thus:

$$x_q = x_m$$

And $$y_q = y_m$$

Case 4: $l_k^2 + l_{m-1}^2 + l_m^2 \geq 0$ and $l_k^2 + l_{m-1}^2 - l_m^2 \geq 0$ Referring to FIG. 21, it is possible that $l_k^2 + l_{m+1}^2 + l_m^2 \geq 0$ and $l_k^2 + l_{m-1}^2 + l_m^2 \geq 0$ (i.e. $\cos \alpha_{m1}$ and $\cos \alpha_{m2} \geq 0$). In this case, Case 1 applies.

Referring back to FIG. 16, expressions to determine if k, and thus the host vehicle 10 itself, is inside or outside the area defined by the warning box (e.g., as represented by the circumferential path P or the area of interest 100) can be determined for each of the eight characteristic configurations shown. With the coordinates of $p_q$ ($x_q$, $y_q$) known, the controller 22 of the vehicle monitoring system 12 on the host vehicle 10 can perform the following calculations to determine whether the point k lies within or outside the boundary defined by the warning box (e.g., as represented by the circumferential path P or the area of interest 100).

Angle $\beta_1$ Greater than or Equal to 0 and Less than $\pi/2$

Figure 22:
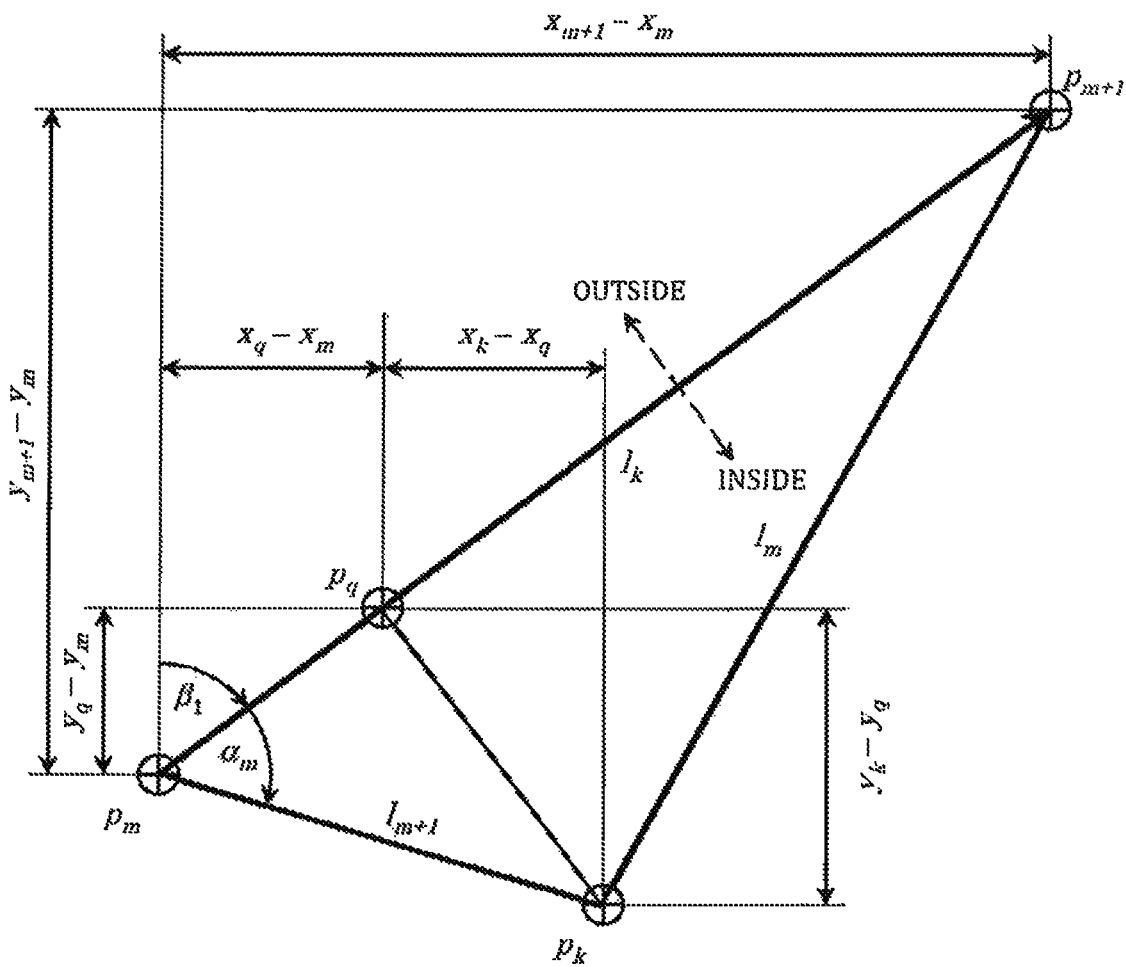

For the case where the angle $\beta_1$ is equal to or greater than zero and less than $\pi/2$ as illustrated in FIG. 22, it can be seen that as long as $x_k$ is greater than or equal to $x_q$ and $y_k$ is less than or equal to $y_q$, the point k falls within the defined boundary. The following expressions can be used to define this case mathematically where:

$$f_1(\beta_1) = \frac{1}{4}\left(\frac{\pi/2 - \beta_1}{|\pi/2 - \beta_1| + \sigma} + 1\right) = 1 \text{ if } 0 \leq \beta_1 < \frac{\pi}{2}$$

otherwise $f_1(\beta_1) = 0$.
And $$f_1(x, y) = \frac{1}{4}\left(\frac{x_k - x_q + \sigma}{|x_k - x_q| + \sigma} + 1\right)\left(\frac{y_q - y_k + \sigma}{|y_q - y_k| + \sigma} + 1\right) = 1$$

if the point k lies below and to the right of the reference point $p_q$ otherwise $f_1(x,y) = 0$.

Angle $\beta_1$ equal to $\pi/2$

Figure 23:
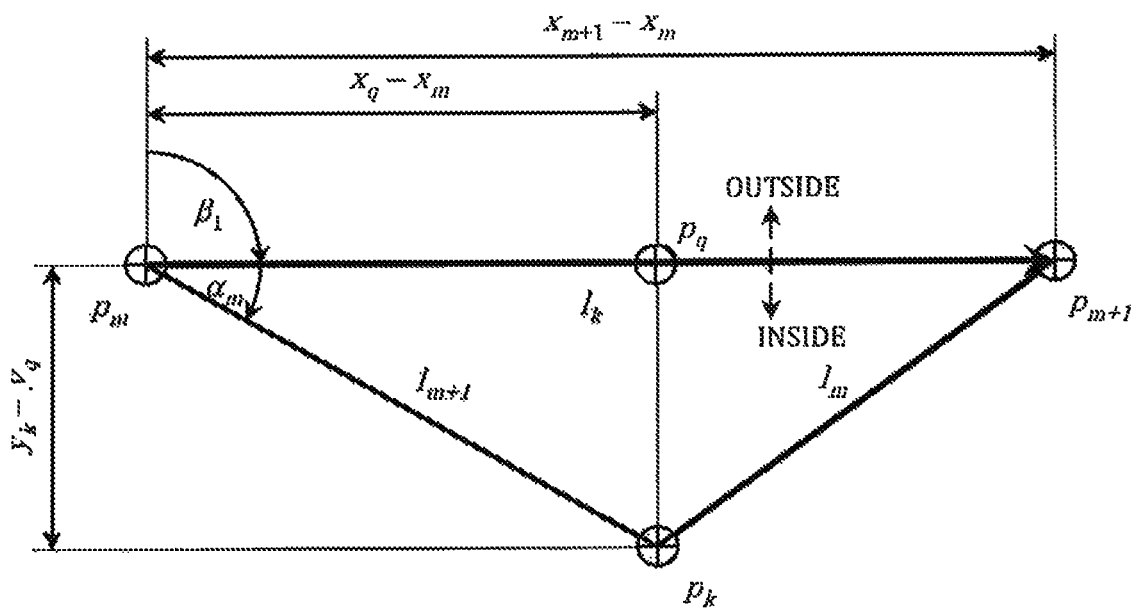

For the case where the angle/A is equal to $\pi/2$ as illustrated in FIG. 23, it can be seen that as long as $y_k$ is less than or equal to $y_q$, point k falls within the defined boundary. The following expressions can be used to define this case mathematically where:

$$f_2(\beta_1) = \frac{1}{4}\left(\frac{\beta_1 - \pi/2 + \sigma}{|\beta_1 - \pi/2| + \sigma} + 1\right)\left(\frac{\pi/2 - \beta_1 + \sigma}{|\pi/2 - \beta_1| + \sigma} + 1\right) = 1$$

if $\beta_1 = \frac{\pi}{2}$ otherwise $f_2(\beta_1) = 0$. And $$f_2(x, y) = \frac{1}{2}\left(\frac{y_q - y_k + \sigma}{|y_q - y_k| + \sigma} + 1\right) = 1$$

if the point k lies below the reference point $p_q$ otherwise $f_2(x,y) = 0$.

Angle $\beta_1$ greater than or equal to $\pi/2$ and less than $\pi$

Figure 24:
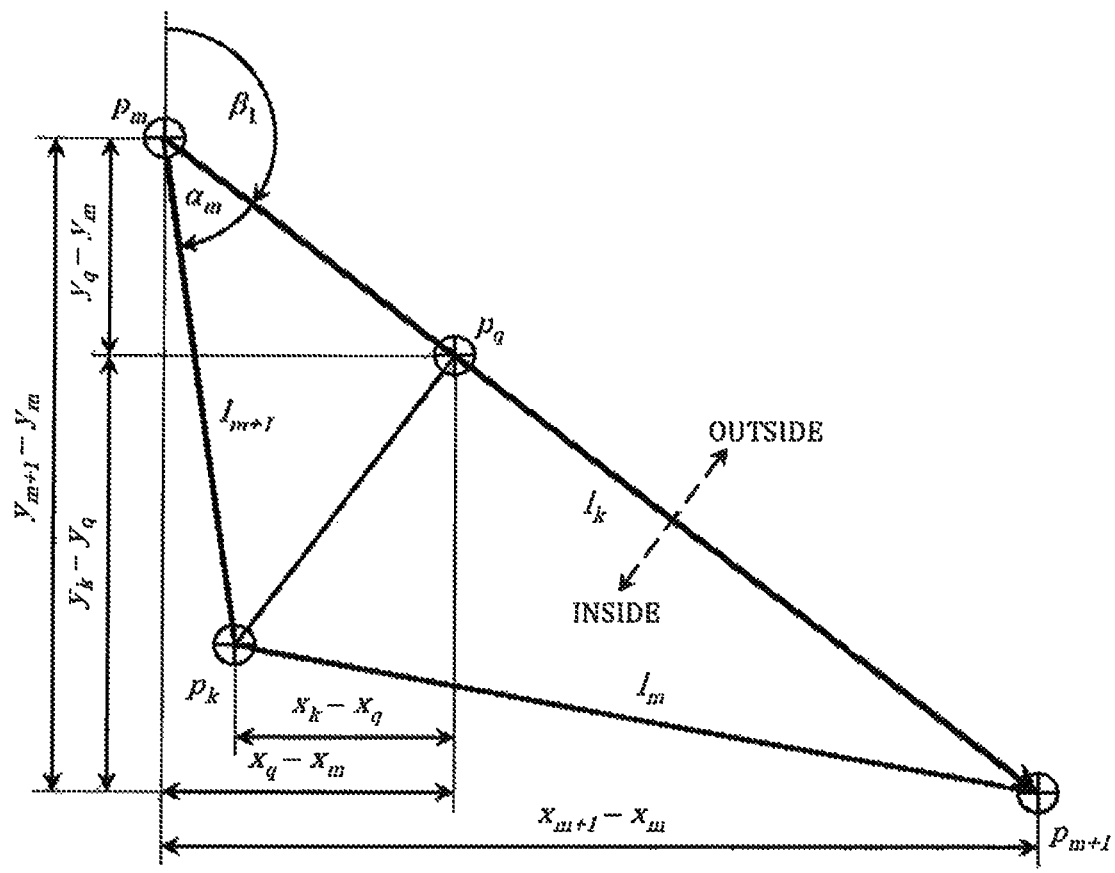

For the case where the angle flu is equal to or greater than $\pi/2$ and less than $\pi$ as illustrated in FIG. 24, it can be seen that as long as $x_k$ is less than or equal to $x_q$ and $y_k$ is less than or equal to $y_q$, the point k falls within the defined boundary. The following expressions can be used to define this case mathematically where:

$$f_3(\beta_1) = \frac{1}{4}\left(\frac{\beta_1 - \pi/2 + \sigma}{|\beta_1 - \pi/2| + \sigma} + 1\right)\left(\frac{\pi - \beta_1}{|\pi - \beta_1| + \sigma} + 1\right) = 1$$

if $\frac{\pi}{2} \leq \beta_1 < \pi$ $f_3(\beta_1) = 0.$ otherwise
And $$f_3(x, y) = \frac{1}{4}\left(\frac{x_q - x_k + \sigma}{|x_q - x_k| + \sigma} + 1\right)\left(\frac{y_q - y_k + \sigma}{|y_q - y_k| + \sigma} + 1\right) = 1$$

if point k lies below and to the left of reference point $p_q$ otherwise $f_3(x,y)=0$.

Angle $\beta_1$ Equal to $\pi$

Figure 25:
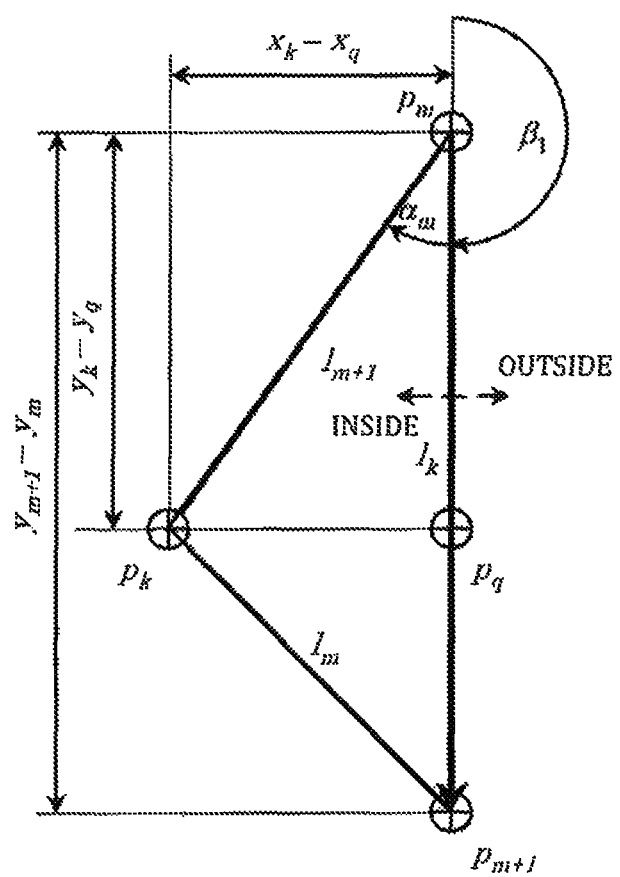

For the case where the angle $\beta_1$ is equal to gas illustrated in FIG. 25, it can be seen that as long as $x_k$ is less than or equal to $x_q$, the point k falls within the defined boundary. The following expressions can be used to define this case mathematically where:

$$f_4(\beta_1) = \frac{1}{4}\left(\frac{\beta_1 - \pi + \sigma}{|\beta_1 - \pi| + \sigma} + 1\right)\left(\frac{\pi - \beta_1}{|\pi - \beta_1| + \sigma} + 1\right) = 1$$

when $\beta_1 = \pi$ otherwise it equals 0. And $$f_4(x, y) = \frac{1}{2}\left(\frac{x_q - x_k + \sigma}{|x_q - x_k| + \sigma} + 1\right) = 1$$

if the point k lies to the left of the reference point $p_q$ otherwise $f_4(x,y)=0$.

Angle $\beta_1$ Greater than or Equal to $\pi$ and Less than $3\pi/2$

Figure 26:
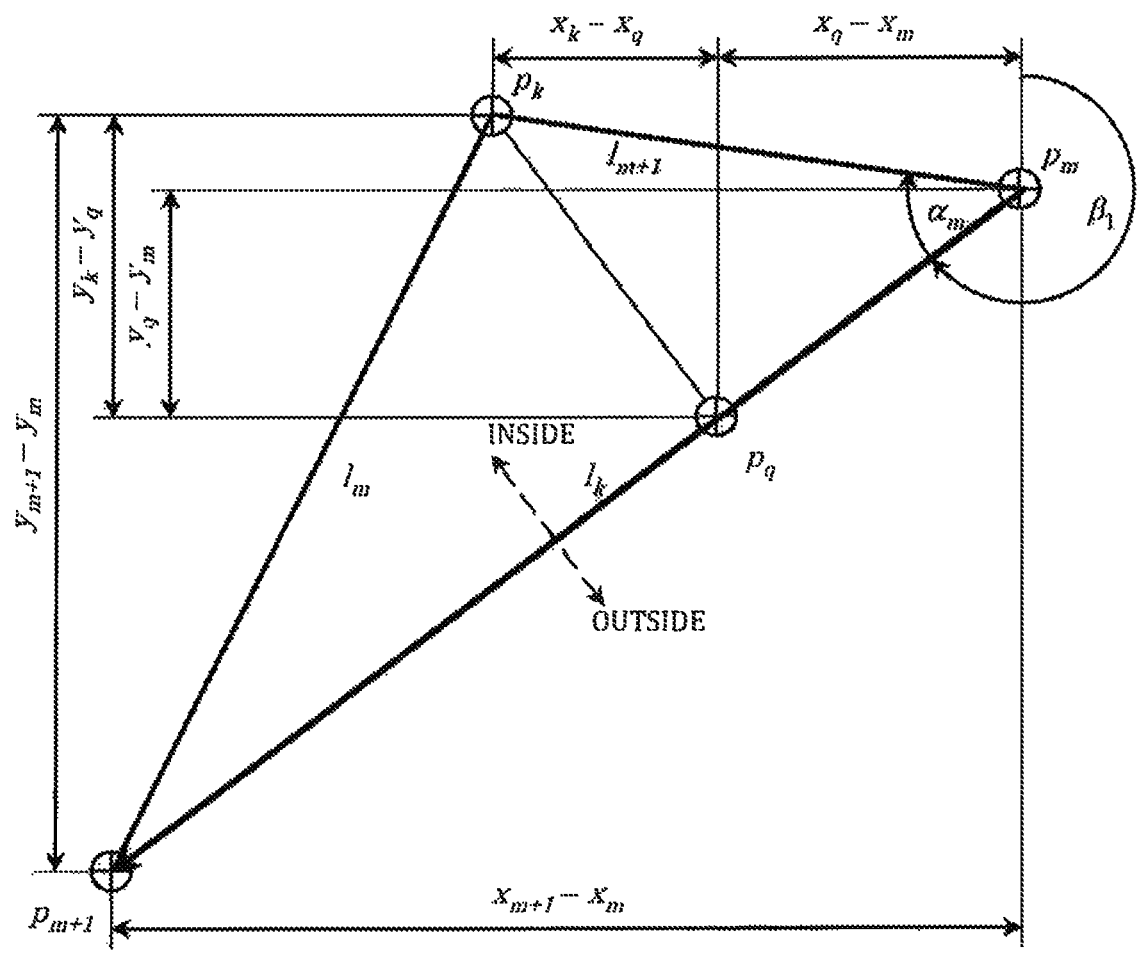

For the case where the angle fit is equal to or greater than $\pi$ and less than $3\pi/2$ as illustrated in FIG. 26, it can be seen that as long as $x_k$ is less than or equal to $x_q$ and $y_k$ is greater than or equal to $y_q$, the point k falls within the defined boundary. The following expressions can be used to define this case mathematically where:

$$f_5(\beta_1) = \frac{1}{4}\left(\frac{\beta_1 - \pi + \sigma}{|\beta_1 - \pi| + \sigma} + 1\right)\left(\frac{3\pi/2 - \beta_1}{|3\pi/2 - \beta_1| + \sigma} + 1\right) = 1$$

if $\pi \leq \beta_1 < \frac{3}{2}\pi$ otherwise $f_5(\beta_1)=0$.
And $$f_5(x, y) = \frac{1}{4}\left(\frac{x_q - x_k + \sigma}{|x_q - x_k| + \sigma} + 1\right)\left(\frac{y_k - y_q + \sigma}{|y_k - y_q| + \sigma} + 1\right) = 1$$

if the point k lies above and to the left of the reference point $p_q$ otherwise $f_1(x,y)=0$.

Angle $\beta_1$ equal to $3\pi/2$

Figure 27:
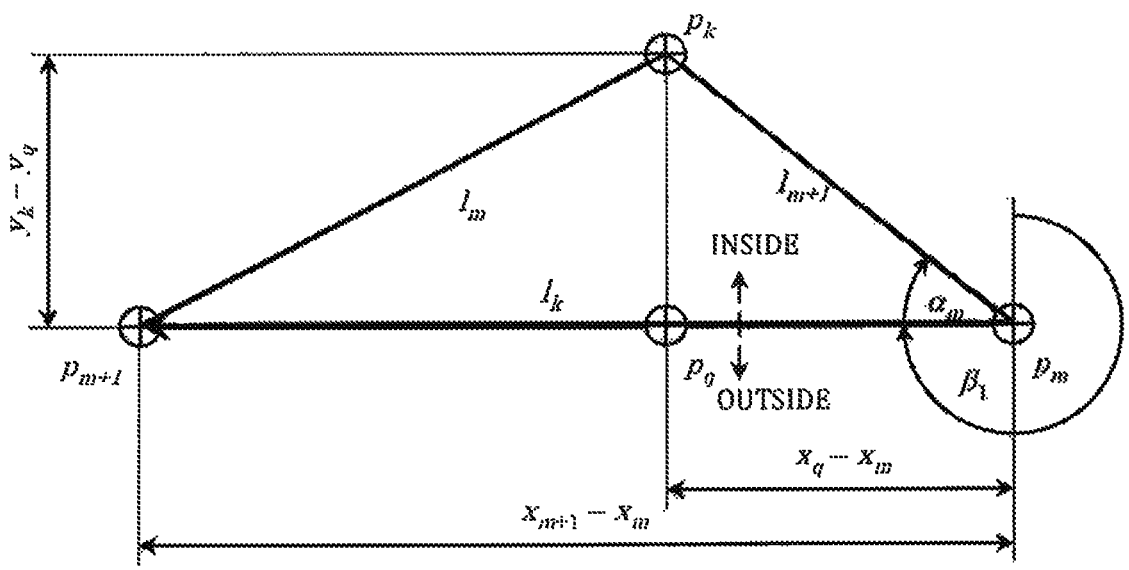

For the case where the angle $\beta_1$ is equal to $3\pi/2$ as illustrated in FIG. 27, it can be seen that as long as $y_k$ is greater than or equal to $y_q$, the point k falls within the defined boundary. The following expressions can be used to define this case mathematically where:

$$f_6(\beta_1) = \frac{1}{4}\left(\frac{\beta_1 - 3\pi/2 + \sigma}{|\beta_1 - 3\pi/2| + \sigma} + 1\right)\left(\frac{3\pi/2 - \beta_1 + \sigma}{|3\pi/2 - \beta_1| + \sigma} + 1\right) = 1$$

when $\beta_1 = \frac{3}{2}\pi$ otherwise $f_6(\beta_1)=0.$

And $$f_6(x, y) = \frac{1}{2}\left(\frac{y_k - y_q + \sigma}{|y_k - y_q| + \sigma} + 1\right) = 1$$

if the point k lies above the reference point $p_q$ otherwise $f_6(x,y)=0$.

Angle $\beta_1$ greater than or equal to $3\pi/2$ and less than $2\pi$

Figure 28:
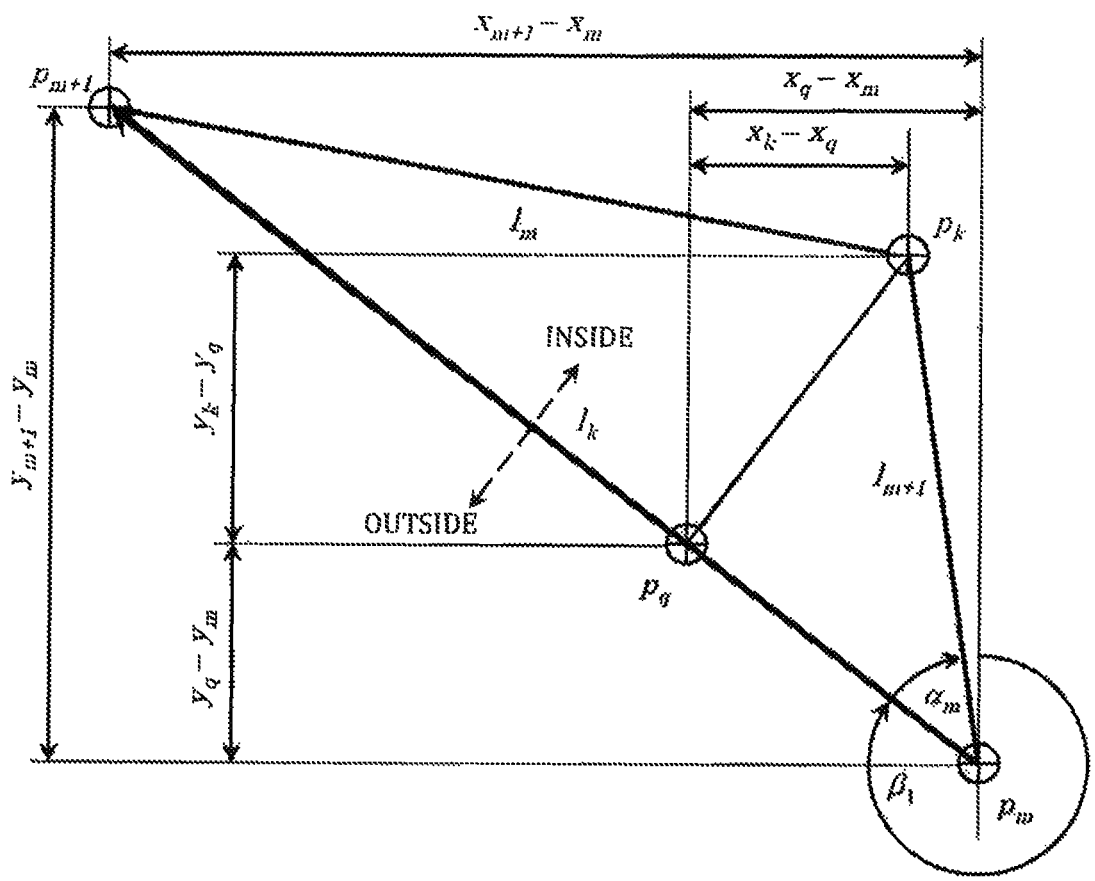

For the case where the angle $\beta_1$ is equal to or greater than $3\pi/2$ and less than $2\pi$ as illustrated in FIG. 28, it can be seen that as long as $x_k$ is greater than or equal to $x_q$ and $y_k$ is greater than or equal to $y_q$, the point k falls within the defined boundary. The following expressions can be used to define this case mathematically where:

$$f_7(\beta_1) = \frac{1}{4}\left(\frac{\beta_1 - 3\pi/2 + \sigma}{|\beta_1 - 3\pi/2| + \sigma} + 1\right)\left(\frac{2\pi - \beta_1}{|2\pi - \beta_1| + \sigma} + 1\right) = 1$$

if $\frac{3}{2}\pi \leq \beta_1 < 2\pi$ otherwise $f_7(\beta_1)=0$.
And $$f_7(x, y) = \frac{1}{4}\left(\frac{x_k - x_q + \sigma}{|x_k - x_q| + \sigma} + 1\right)\left(\frac{y_k - y_q + \sigma}{|y_k - y_q| + \sigma} + 1\right) = 1$$

if the point k lies above and to the right of the reference point $p_q$ otherwise $f_7(x,y)=0$.

Angle $\beta_1$ equal to 0

Figure 29:
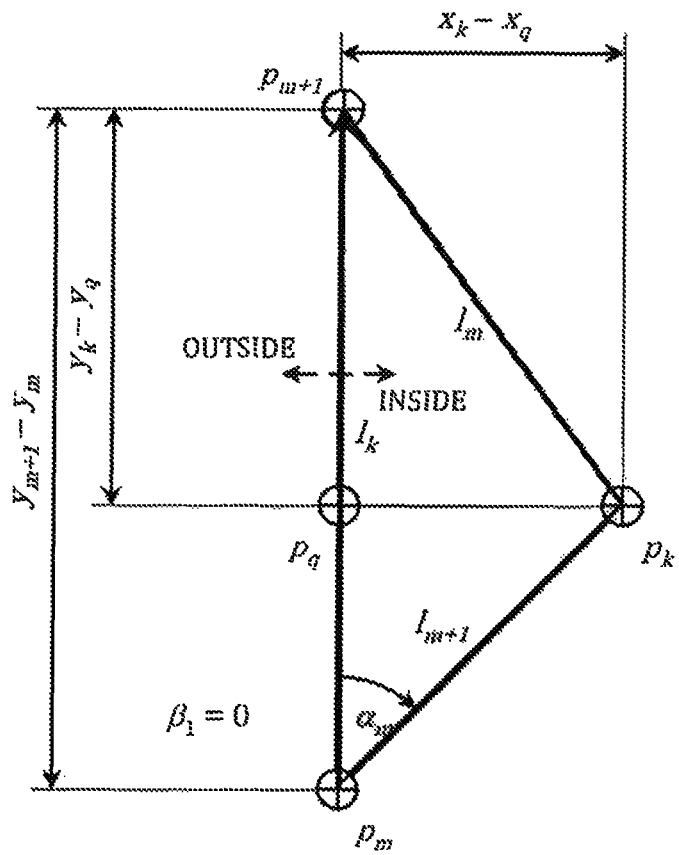

For the case where the angle $\beta_1$ is equal to zero as illustrated in FIG. 29, it can be seen that as long as $x_k$ is greater than or equal to $x_q$, the point k falls within the defined boundary. The following expressions can be used to define this case mathematically where:

$$f_8(\beta_1) = \frac{1}{4}\left(\frac{\beta_1 - 0 + \sigma}{|\beta_1 - 0| + \sigma} + 1\right)\left(\frac{0 - \beta_1 + \sigma}{|0 - \beta_1| + \sigma} + 1\right) = 1$$

when $\beta_1=0$ otherwise $f_6(\beta_1)=0$. And $$f_8(x, y) = \frac{1}{2}\left(\frac{x_k - x_q + \sigma}{|x_k - x_q| + \sigma} + 1\right)$$

if the point k lies to the right of the reference point $p_q$ otherwise $f_8(x,y)=0$.

Using the above information, the controller 22 of the vehicle monitoring system 12 on the host vehicle 10 determines whether the vehicle condition lies within the waring box (e.g., the area of interest based on a comparison between coordinates of the condition point $p_k$ and the coordinate condition data). In particular, the controller 22 determines the following:

if $\sum_{i=1}^{8} Q_i = 1$ where:

$Q_1 = f_1(\beta_1) \times f_1(x, y)$ $Q_2 = f_2(\beta_1) \times f_2(x, y)$ $Q_3 = f_3(\beta_1) \times f_3(x, y)$ $Q_4 = f_4(\beta_1) \times f_4(x, y)$ $Q_5 = f_5(\beta_1) \times f_5(x, y)$ $Q_6 = f_6(\beta_1) \times f_6(x, y)$ $Q_7 = f_7(\beta_1) \times f_7(x, y)$ $Q_8 = f_8(\beta_1) \times f_8(x, y)$ then the point k lies, and thus the host vehicle 10, within the warning box (e.g., as represented by the circumferential path P or the area of interest 100), otherwise the point k, and thus the host vehicle 10, falls outside of the warning box.

Thus, referring back to the flowchart in FIG. 3, the controller 22 of the vehicle monitoring system 12 can compare the path of the host vehicle 10 with the predicted path of the remote vehicle 14 in Step S7. If the controller 22 determines in Step S8 that the proposed acceleration of the host vehicle 10 is greater than a predetermined threshold, the controller 22 can therefore determine that the host vehicle 10 may enter the warning box in the manner described above. In this case, the controller 22 can control the host vehicle 10 in Step S9 to issue a warning message that can be perceived by the driver of the host vehicle 10. This warning message can be any type of haptic, visual, audio or audiovisual message as understood in the art. The controller 22 can also control the host vehicle 10 to perform, for example, any suitable vehicle control process, such as a braking process and so on, upon determining that the host vehicle 10 may enter the warning box. However, if the controller 22 determines in Step S8 that the host vehicle 10 will not enter the warning box, the processing returns to Step S5 and repeats as described above.

While only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle monitoring system, comprising:
an electronic controller configured to receive data representing points of interest on a vehicle and on a trailer being towed by the vehicle, determine geometric relationships between the points of interest based on the data, and calculate a perimeter defined by a two-dimensional area encircling the vehicle and the trailer based on the geometric relationships, the two-dimensional area defined by a same start and end point; and
a wireless communicator operatively connected to the electronic controller configured to receive or transmit one of the data representing the points of interest, and the area based on the geometric relationships.

2. The vehicle monitoring system according to claim 1, wherein
the electronic controller is configured to determine the geometric relationships between the points of interest based on a heading of the trailer in relation to a heading of the vehicle.

3. The vehicle monitoring system according to claim 2, wherein
the electronic controller is configured to determine that the area changes as the heading of the trailer in relation to the heading of the vehicle changes.

4. The vehicle monitoring system according to claim 1, wherein
the electronic controller is configured to determine the geometric relationships between the points of interest based on a steering angle and heading of the vehicle.

5. The vehicle monitoring system according to claim 1, wherein
the electronic controller is configured to determine geometric relationships between the points of interest based on a relationship between the trailer and a hitch that couples the trailer to the vehicle.

6. The vehicle monitoring system according to claim 1, wherein
the electronic controller is configured to determine whether a path of a host vehicle, that is different from the vehicle, indicates entry of the host vehicle into the area.

7. The vehicle monitoring system according to claim 6, wherein
the electronic controller is configured to control the host vehicle to issue a warning upon determining that the path of the host vehicle indicates entry of the host vehicle into the area.

8. The vehicle monitoring system according to claim 1, wherein
the electronic controller is disposed on a host vehicle that is different from the vehicle, and the wireless communicator is configured to receive the data from the vehicle by wireless communication between the host vehicle and the vehicle.

9. The vehicle monitoring system according to claim 1, wherein
the points of interest include front corners of the vehicle and rear corners of the trailer.

10. The vehicle monitoring system according to claim 1, wherein
the data includes reference point data representing a location of a global positioning system antenna on the vehicle.

11. The vehicle monitoring system according to claim 10, wherein
the electronic controller is configured to determine the geometric relationships based on a relationship between the location of the global positioning system antenna and the points of interest on the vehicle.

12. The vehicle monitoring system according to claim 10, wherein
the electronic controller is configured to determine the geometric relationships based on a relationship between the location of the global positioning system antenna and the points of interest on the trailer.

13. The vehicle monitoring system according to claim 10, wherein
the electronic controller is configured to determine the geometric relationships based on a relationship between the location of the global positioning system antenna and an end of the trailer furthest from the location of the global positioning system antenna.

14. The vehicle monitoring system according to claim 1, wherein
the electronic controller is configured to determine geometric relationships between the points of interest based on a relationship between a single wheel axle of the trailer and a hitch that couples the trailer to the vehicle.

15. A vehicle monitoring method comprising:
determining, by an electronic controller, geometric relationships between points of interest on a vehicle and on a trailer towed by the vehicle based on data representing the points of interest on the vehicle and on the trailer;
calculating, by the electronic controller, a perimeter defined by a two-dimensional area encircling the vehicle and the trailer based on the geometric relationships, the two-dimensional area defined by a same start and end point; and
monitoring, by the electronic controller, a location of a host vehicle, different from the vehicle, in relation to the area.

16. The vehicle monitoring method according to claim 15, wherein
the determining includes determining, by the electronic controller the geometric relationships between the points of interest based on a heading of the trailer in relation to a heading of the vehicle.

17. The vehicle monitoring method according to claim 1, wherein
the data includes at least one of latitude, longitude, speed, steering angle, vehicle size, trailer width and trailer length.

* * * * *